US010338639B1

(12) United States Patent
Lockey et al.

(10) Patent No.: US 10,338,639 B1
(45) Date of Patent: Jul. 2, 2019

(54) MOBILE DEVICE PROCESSOR UNIT

(71) Applicant: Amazon Technologies, Inc., Reno, NV (US)

(72) Inventors: Aaron Benjamin Lockey, Cedar Park, TX (US); Timothy Joseph Thompson, Leander, TX (US)

(73) Assignee: Amazon Technologies, Inc., Reno, NV (US)

( * ) Notice: Subject to any disclaimer, the term of this patent is extended or adjusted under 35 U.S.C. 154(b) by 125 days.

(21) Appl. No.: 14/274,402

(22) Filed: May 9, 2014

(51) Int. Cl.
*G06F 13/14* (2006.01)
*G06F 1/16* (2006.01)

(52) U.S. Cl.
CPC .................. *G06F 1/1632* (2013.01)

(58) Field of Classification Search
None
See application file for complete search history.

(56) References Cited

U.S. PATENT DOCUMENTS

| | | | | |
|---|---|---|---|---|
| 2003/0161101 A1* | 8/2003 | Hillyard | ..................... | G06F 1/16 361/679.46 |
| 2005/0053008 A1* | 3/2005 | Griesing | ................. | H04L 43/50 370/241 |
| 2005/0060409 A1* | 3/2005 | Dube | ...................... | H04L 29/06 709/226 |
| 2005/0240818 A1* | 10/2005 | James, Jr. | ............... | G06F 11/22 714/27 |
| 2010/0172372 A1* | 7/2010 | Sichner | .................... | H04L 12/40 370/463 |
| 2012/0075777 A1* | 3/2012 | Nehete | .................... | G01R 11/04 361/659 |
| 2013/0178203 A1* | 7/2013 | Venkataraman | ........ | H04W 4/16 455/423 |
| 2014/0187173 A1* | 7/2014 | Partee | .................... | H04B 17/00 455/67.12 |
| 2015/0350032 A1* | 12/2015 | Marsyla | ................ | H04W 24/10 715/740 |

OTHER PUBLICATIONS

U.S. Appl. No. 13/925,139, filed Jun. 24, 2013, Lokendra Singh.

* cited by examiner

*Primary Examiner* — Ilwoo Park
(74) *Attorney, Agent, or Firm* — Robert C. Kowert; Meyertons, Hood, Kivlin, Kowert & Goetzel, P.C.

(57) ABSTRACT

A mobile device processor unit enables a remotely-located user to interact with a user interface associated with a complete mobile device on a computer supporting the user, where the interface is presented based on execution of functionality of the complete mobile device on a limited selection of components of the complete mobile device. The limited selection of components is included in a mobile device processor unit. The processor unit can be installed in a slot space of a support chassis to structurally support the limited selection of components and to couple the processor unit with a connector to communicatively couple the components with the remote user via a communication network.

20 Claims, 12 Drawing Sheets

MOBILE DEVICE PROCESSOR UNIT

BACKGROUND

Various organizations often desire to enable user access to, and interaction with, various functions of various mobile devices. Mobile devices can include smartphones, electronic readers, computing tablets, and similar processor-based electronic consumer devices. Such access and interaction can be desired to enable a user to become familiarized with various mobile device functions, to test various mobile device functions, including programs of instruction, to showcase various mobile device functions Such users may be unable to easily acquire and interact directly with a tangible mobile device. For example, a user may include a customer service agent who is communicating over a communication network. The user may not possess the mobile device, although familiarization with the various functions of the device may be desired. Similarly, a user may include a developer of one or more mobile device programs of instruction, including one or more mobile device applications, who desires to test such applications in a mobile device environment but may not possess such a mobile device. In another example, a user may include a prospective customer who wishes to "test drive" various aspects of a mobile device prior to making a decision to purchase the mobile device, despite not having physical access to an article of the mobile device. In another example, a user may include a customer service agent who desires to access a mobile device to guide a customer through a set of mobile device interactions to troubleshoot issues with a mobile device. In another example, a user may include one or more students in a classroom that desire to access a mobile device for educational purposes.

In some cases, simulators and emulators are provided to a user, via a display of a user-supporting computer system, to potentially enable the above access and interaction. Simulators can respond to user-initiated interactions, including user commands provided via an interface of the computer supporting the user, by presenting a simulated interface of the mobile device on the display. The simulated interface may present a simulation of the mobile device interface based on the interactions. For example, where the user provides a command to execute a particular mobile device application, the simulator may present a simulation of the mobile device interface that would be presented on a complete mobile device display executing the application. Simulated interfaces are often simply generated images ("screenshots") of the mobile device interface and may not provide a true representation of the mobile device interface experience to the user.

Emulators may provide an interactive mobile device interface on the display of the user's computer, where the user can interact with the display to command execution of various mobile device functions and be presented with an interactive mobile device interface based on the commands. A mobile device emulator can be executed in the user's computer, in another network-linked computer, etc., as virtual machines in a computer that simulate the actual functionality of the mobile device. However, because a mobile device may utilize different operating systems than the computer implementing the emulation of the mobile device, interpretations of mobile device functions by the implementing computer may reduce performance of the mobile device functionality from the user's perspective, as the computer implementing the emulation may be required to translate user commands to be interpreted by the emulated mobile device, translate mobile device output to be presented to the user, etc. In addition, because some actual mobile devices may include hardware components that are optimized to execute mobile device programs associated with the device, an emulator of the mobile device may be incapable of providing an exact replication of the functionality of a complete mobile device.

Figure 1:
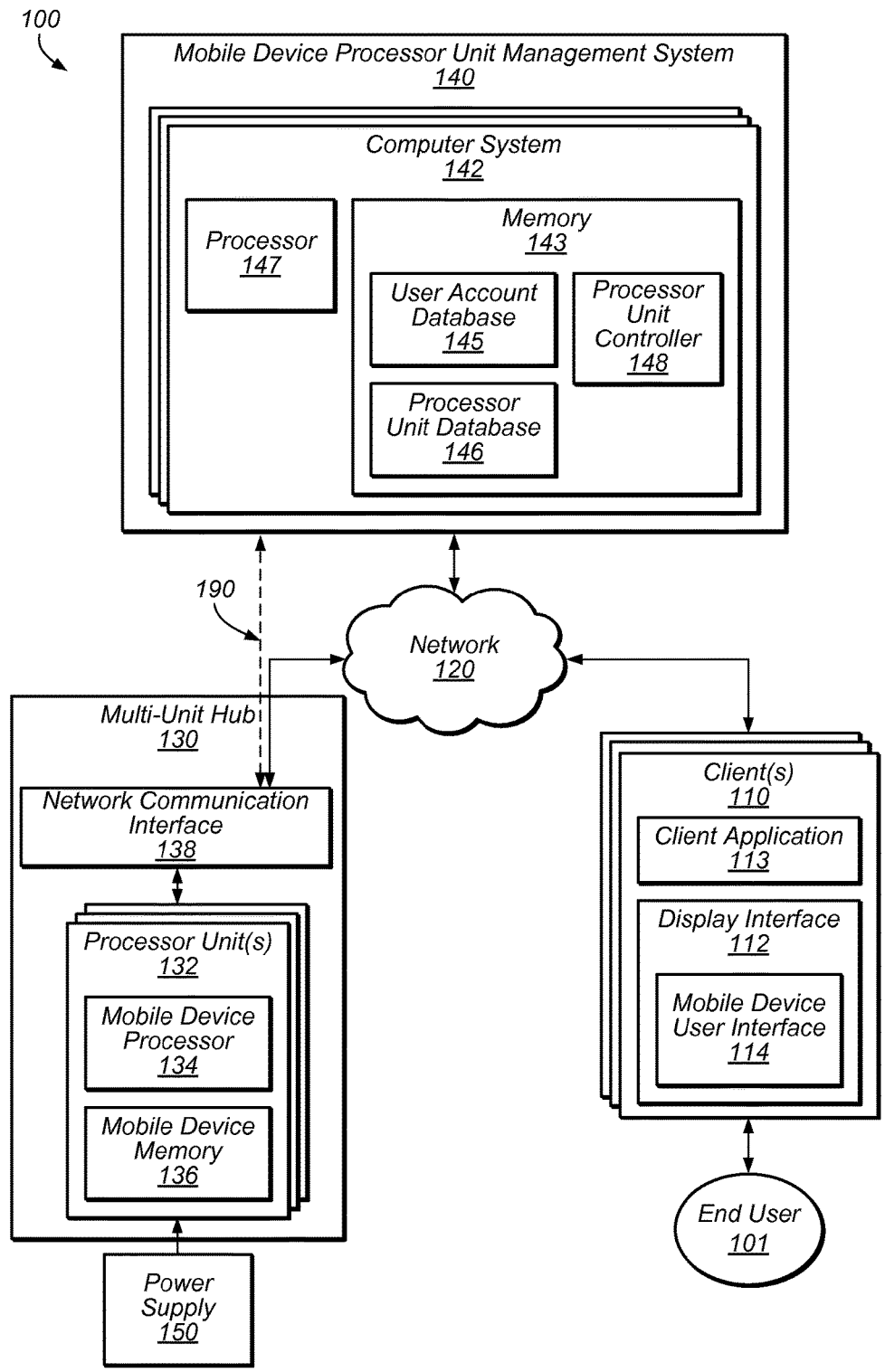
FIG. 1 illustrates a system including mobile device processor units and a management system communicatively coupled to one or more clients via a communication network according to some embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of mobile device processor units, and systems and methods for implementing one or more mobile device processor units to enable remote user access to various mobile device functions, are disclosed. According to one embodiment, a system includes a mobile device processor unit that can respond to a remote user interacting with the mobile device processor unit over a communication network, execute a mobile device program of instructions and generate a display signal to present a mobile device user interface on a display of a computer system supporting the user. The mobile device processor unit includes a set of mobile device components that correspond to a limited selection of components of an individual complete mobile device that can execute the program of instructions. The system includes a mobile device unit support chassis that includes a slot space that can receive the mobile device processor unit and communicatively couple the unit with the user via the network. The mobile device user interface presented on the computer display corresponds to the interface presented on a display of the complete mobile device based at least in part upon execution of the program of instructions.

According to one embodiment, an apparatus includes a mobile device processor unit that enables a set of mobile device components, corresponding to a limited selection of components of an individual complete mobile device, to execute a mobile device program of instructions based at least in part upon communication with a remotely-located user. The mobile device processor unit includes a housing that can receive and structurally support the set of components and a communication connector that can couple to a mobile device component in the housing to communicatively couple the set of components to the user via a communication network.

According to one embodiment, a method includes configuring a set of mobile device components to execute at least one mobile device program of instructions based at least in part upon communication with a remotely-located user. The set of components correspond to a limited selection of components of an individual complete mobile device. The configuring includes installing the set of components in a slot of a mobile device unit support chassis, to structurally support the set of components in a rack structure, and coupling the set of components with a communication pathway of the mobile device unit support chassis to communicatively couple the set of components to the user via a communication network.

As used herein, "backplane" means a plate or board to which other electronic components, such as mass storage devices, circuit boards, can be mounted. Mass storage devices can include one or more hard disk drives, solid state drives, etc. In some embodiments, electronic components are mounted to a backplane in a generally perpendicular orientation relative to the face of the backplane. In some embodiments, electronic components are mounted to a backplane in an angled orientation which is separate from a perpendicular orientation. In some embodiments, a backplane includes one or more power buses that can transmit power to components on the backplane, and one or more data buses that can transmit data to and from components installed on the backplane.

As used herein, a "cable" includes any cable, conduit, or line that carries one or more conductors and that is flexible over at least a portion of its length. A cable may include a connector portion, such as a plug, at one or more of its ends.

As used herein, "circuit board" means any board or plate that has one or more electrical conductors transmitting power, data, or signals from components on or coupled to the circuit board to other components on the board or to external components. In certain embodiments, a circuit board is an epoxy glass board with one or more conductive layers therein. A circuit board may, however, be made of any suitable combination of materials.

As used herein, "chassis" means a structure or element that supports another element or to which other elements can be mounted. A chassis may have any shape or construction, including a frame, a sheet, a plate, a box, a channel, or a combination thereof. In one embodiment, a chassis is made from one or more sheet metal parts. A chassis for a computer system may support circuit board assemblies, power supply units, data storage devices, fans, cables, and other components of the computer system.

As used herein, "computing" includes any operations that can be performed by a computer, such as computation, data storage, data retrieval, or communications.

As used herein, "computer system" includes any of various computer systems or components thereof. One example of a computer system is a rack-mounted server. As used herein, the term computer is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. In the various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, "data center" includes any facility or portion of a facility in which computer operations are carried out. A data center may include servers dedicated to specific functions or serving multiple functions. Examples of computer operations include information processing, communications, testing, simulations, power distribution and control, and operational control.

As used herein, "data center module" means a module that includes, or is suitable for housing and/or physically supporting, one or more computer systems that can provide computing resources for a data center.

As used herein, to "direct" air includes directing or channeling air, such as to a region or point in space. In various embodiments, air movement for directing air may be induced by creating a high pressure region, a low pressure region, or a combination both. For example, air may be directed downwardly within a chassis by creating a low pressure region at the bottom of the chassis. In some embodiments, air is directed using vanes, panels, plates, baffles, pipes or other structural elements.

As used herein, "member" includes a single element or a combination of two or more elements (for example, a member can include two or more sheet metal parts fastened to one another.

As used herein, a "module" is a component or a combination of components physically coupled to one another. A module may include functional elements and systems, such as computer systems, racks, blowers, ducts, power distribution units, fire suppression systems, and control systems, as well as structural elements, such a frame, housing, structure, container, etc. In some embodiments, a module is prefabricated at a location off-site from a data center.

As used herein, a "rack" means a rack, container, frame, or other element or combination of elements that can contain or physically support one or more electrical systems, such as servers.

As used herein, a "rack unit" or "U" refers to a measure of standard spacing in a rack. One "rack unit", or "U", is nominally 1.75 inches. As used herein, spacing, dimensions, and pitches based on "rack units" or "U" may allow for tolerances, such as manufacturing tolerances.

As used herein, "room" means a room or a space of a structure. A "computer room" means a room in which computer systems, such as rack-mounted servers, are operated.

As used herein, "shelf" means any element or combination of elements on which an object can be rested or mounted. Such elements or combination of elements may be referred to as shelving members or combination of shelving members, respectively. A shelf may include, for example, a plate, a sheet, a tray, a disc, a block, a grid, a box or a set of support rails. A shelf may be rectangular, square, round, or another shape. In some embodiments, a shelf may include one or more rails.

As used herein, a "slot" means a space in a rack into which one or more components can be installed or removed. In some racks, slots are formed between adjacent shelving members, shelf supports or rails of the rack. A slot of a rack may have any orientation, including horizontal, vertical, or angled. A slot may be included in a shelving module mounted in a rack, where the slot is a space in the shelving module into which one or more components can be installed or removed. In some embodiments, a slot has a standard height or width, including 1U, 2U, or 3U under Electronic Industries Association (EIA)-310-D specifications.

As used herein, a "space" means a space, area or volume.

As used herein, "mounting" a particular element on another element refers to positioning the particular element to be in physical contact with the other element, such that the other element provides one or more of structural support, positioning, structural load transfer, stabilization, shock absorption, some combination thereof, or the like with regard to the particular element. The mounted particular element may be positioned to rest upon one or more upper surfaces of the other element, independent of coupling the elements via one or more coupling elements. In some embodiments, mounting the particular element to another element includes coupling the elements such that the other element provides one or more of structural support, positioning, structural load transfer, stabilization, shock absorption, some combination thereof, or the like with regard to the particular element.

As used herein, "installing" a particular element on another element refers to physically coupling the elements such that the particular element is communicatively coupled with at least the other element. Installing the elements can include electrically coupling the elements via physically coupling an electrical connector of the particular element with a complementary electrical connector of the other element. Installing a particular element to another element can include electrically coupling a portion of the particular element to a portion of the other element and mounting another potion of the particular element to another portion of the other element.

As used herein, "shock absorbing", as applied to a supporting element for another element, means that the supporting element absorbs mechanical energy and/or dampens shock and/or vibration loads. A shock-absorbing material may be elastic, viscoelastic, viscous, or combinations thereof.

In some embodiments, a system links mobile devices to remote end-users via a network connection. The end user is enabled to remotely access one or more mobile devices, over the network, to interact with various mobile device functions of the one or more mobile devices. Mobile device functions, functionality, etc. can include various mobile device programs of instruction, applications, etc. Mobile device functions, functionality, etc. can be associated with the user interface of a mobile device (hereinafter "mobile device user interface") that can be presented to a user via a display of the mobile device. The mobile device user interface may be presented to an end-user, on a display of a computer system supporting the end-user, to enable the end-user to interact with mobile device functions of a remote mobile device via the mobile device user interface presented on the display of the computer system supporting the end-user. As a result, the end-user can access functions, functionality, etc. of a mobile device, including the mobile device user interface, without physically handling and interacting with a tangible mobile device. Such accessing can include commanding the mobile device to execute programs of instructions using at least some components of the mobile device, including processors, memory, circuit boards, etc. Based at least in part upon the programs being executed by the actual components of the mobile device, as opposed to simulations or emulations of same, the experience of interacting with the mobile device, and the behavior of the mobile device in executing various user commands, may be replicated for the end-user more accurately than might be replicated via a simulation, emulation, etc.

In some embodiments, a mobile device that is executing mobile device programs of instructions based on remote user interactions may require resources that are not utilized to provide the remote access experience to the remote end-user. For example, a mobile device may include a display that can present the mobile device user interface. Because the mobile device user interface is presented to a remote end-user over a communication network, the display may not be required to enable the remote access experience. As a result, the physical volume occupied by the display, and the power consumed by same, in some embodiments, is superfluous to implementation of remote user access. Similarly, a mobile device may include one or more components of a power supply, including batteries, charging hardware, etc., which may not be required for remote user access. For example, where a mobile device is to be utilized for remote user access, the device may not be required to be mobile, disconnected from a hard line power cable connection, etc. In fact, a mobile device utilized for remote user access may be mounted in a fixed location, rack, etc., as mobility of the device and its components may be superfluous for the remote access experience. As a result, in some embodiments, such power components may be superfluous to implementation of remote user access. Furthermore, other elements of a complete mobile device which are associated with enabling mobile use of the device and are not required to execute one or more programs of instruction, including a durable casing, internal structural shock absorbing elements, etc. may be superfluous to enabling remote user access of the device.

In some embodiments, the components of a mobile device that can execute one or more mobile device programs of instructions include a limited selection of the various components comprised in a complete mobile device. For example, where a mobile device includes a shock-absorbing case, power supply, display interface, processors, memory, circuit boards, wireless communication interface, etc., a limited selection of components, including at least the processors, at least some of the circuit boards, etc. can execute one or more mobile device programs of instruction, while the casing, power supply may not. Other components, including memory, some circuit boards, the wireless communication interface, etc., may be used in concert with other components to execute at least some programs of instructions and not others.

In some embodiments, the limited selection of mobile device components that can execute at least some mobile device programs of instructions can be communicatively coupled and mounted in a mobile device processor unit. The mobile device processor unit, also referred to interchangeably hereinafter as simply a "processor unit", can include components that can execute at least some of the mobile device programs of instructions that an individual complete mobile device can execute. In some embodiments, the limited selection of components includes particular components, including a wireless transceiver, etc., that can be used in executing certain programs of instructions and not others. The processor unit may not include some components of the complete mobile device, including the complete device's casing, display interface, power supply, etc., and may therefore occupy a significantly reduced volume of space relative to the complete device. Furthermore, the processor unit, based at least in part upon not including mobile device components that consume significant amounts of power, including the display interface, may require significantly less power to perform mobile device programs of instructions than the complete mobile device.

A processor unit, in some embodiments, can be installed in a support chassis. The support chassis may include communication pathways, including network connectors, cabling, etc., which can communicatively couple a processor unit to a communication network, enabling remote user access to the processor unit over the network to execute mobile device programs of instruction. The chassis can enable multiple processor units to be installed in a compact space while providing structural and communicative support to the processor units. The chassis can include discrete mounting portions, including slot spaces ("slots") in which processor units can be installed, air moving devices to provide cooling to the mobile device components in the processor units, and various components that can provide communicative coupling between processor units and a communication network. In some embodiments, a support chassis can enable each of a set of processor units installed therein to receive power via a common power supply, which can preclude a requirement for a separate power supply for each processor unit as might be required if each processor unit were a complete mobile device.

In some embodiments, processor units are included in a networked system that manages access to the processor units by one or more various end-users. The system can manage various aspects of user access, including which end-users can access the processor units, duration of an access session, type and diversity of functionality that can be accessed by a user, etc. The system can manage which processor units are allocated to remote access by which end-users. As a result, the system can enable remote access by multiple end-users to one or more processor units over time to access and interact with various mobile device functionalities.

FIG. 1 illustrates a system including mobile device processor units and a management system communicatively coupled to one or more clients via a communication network according to some embodiments. The system 100 includes one or more processor unit "hubs" 130, a mobile device processor unit management system 140, and one or more clients 110 in data communication (also referred to as being "communicatively coupled") via a communication network 120 (also referred to as simply a "network"). The network 120 can include the Internet, intranets, extranets, wide area networks (WANs), local area networks (LANs), wired networks, wireless networks, or other suitable networks, one or more combinations thereof, or the like.

The multi-unit hub 130 includes one or more processor units 132, a network communication interface 138, and potentially other devices as may be appreciated. The hub 130 receives power from one or more power supplies 150. Each processor unit 132 may comprise one or more components corresponding to components included in an individual complete mobile device. Such a mobile device can include a smartphone, computer tablet, electronic reader, etc.

In some embodiments, the components included in a processor unit 132 correspond to a limited selection of components of a mobile device that can execute one or more mobile device programs of instructions on the mobile device, including one or more mobile device applications. Such a limited selection of components may not include additional components of a consumer mobile device such as for example, a casing, a battery, a camera, a display, and/or other features and peripherals that are typically included in a consumer mobile device. As shown in the illustrated embodiment, the one or more mobile device components included in a processor unit 132 can include a processor circuit, including a mobile device processor 134, and a memory 136. Both components 134 and 136 can be communicatively coupled with each other and can be communicatively coupled, via at least one of the components 134, 136, to a local interface included on the processor unit 132. Such a local interface may comprise, for example, a data bus with an accompanying address/control bus or other bus structure as can be appreciated.

In some embodiments, the processor unit 132 includes one or more interfaces, which can include one or more input/output channels such as, for example, a universal serial bus (USB) port, a display port, a power input, and/or any other input/output channels as may be appreciated. The processor unit 132 can include a power inlet port that can receive power from a power supply 150 via a power cable.

Although, as shown in the illustrated embodiment, each processor unit 132 may include an associated memory 136, some processor units 132 need not include a separate associated memory 136 in the set of components comprised in the respective processor units, but rather memory may be provided to each processor unit as part of a logical partitioning of a single physical memory, which may be externally located from one or more of the processor units, as may be appreciated. In some embodiments, a component included in one processor unit can be used in the execution of one or more mobile device programs of instructions by components included in another separate processor unit. For example, a processor 134 included in one processor unit 132 may interact with and utilize a wireless communication interface included in another separate processor unit 132.

The network communications interface 138 can communicatively couple one or more of the processor units 132 and at least one client 110, the management system 140, etc. via network 120. The network communications interface 138 may be a USB hub that contains multiple USB interfaces. Each processor unit 132 may include a USB interface that may be connected to the network communications interface 138. Accordingly, the network communications interface 138 may be used to interact with the managing system 140 via an appropriate USB connection, either directly or through the network 120. The network communications interface 138 may be a network switch device that contains multiple Ethernet interfaces, where each processor unit 132 may include an Ethernet interface that may be connected to the network switch device. The network communications interface(s) 138 may be integrated into a multi-unit hub 130, or it may be a standalone interface associated with one or more multi-unit hubs 130. In some embodiments, the network communications interface 138 need not be provided, and each processor unit 132 can be coupled with the network 120 without the use of a network communications interface 138 external to the processor unit 132. For example, a network communications interface 138 may be included in a processor unit, such as a network communication adapter device, and the processor unit 132 may be communicatively coupled to network 120 via such an interface 138. In addition, in certain embodiments, the processor unit(s) 132 can communicatively couple with one or more systems via a wireless network connection. In some embodiments, an interface 138 includes a computer system that communicatively couples with network 120 and is coupled to the processor units 132 via a reverse tethering connection, so that the processor units 132 are communicatively coupled to the network via a reverse tethering connection with the computer system. A reverse tethering connection can include a USB cable connection coupling the computer system and various processor units 132. In some embodiments, hub 130 includes an expander device, including a USB "hub", to establish a reverse tethering connection to a particular number of processor units 132 via a lesser number of connectors of the computer system. In some embodiments, one or more processor units 132 communicatively couple with one or more computer systems 142 of system 140 via one or more direct communication pathways 190, which can include one or more communication pathways which bypass network 120, including a USB cable connection, network cable connection, etc. between a processor unit 132 and a computer system 142.

The managing system 140 may comprise one or more computer systems 142. In some embodiments, some or all of system 140, including one or more computer systems 142, are located in the multi-unit hub 130. Such computer systems 142 may be located in a single installation, distributed among multiple different geographical locations, some combination thereof, or the like. Each computer system 142 can include one or more instances of processor circuitry (hereinafter "processors") 147, one or more memories 143, and can be communicatively coupled to network 120 via one or more interfaces (not shown). A memory 143 can include data and several processor-executable components. For example, in the illustrated embodiment, memory 143 includes a processor unit controller 144, and databases 145, 146. Additional programs of instruction, including operating systems, may be stored in memory 143 and executable by processor 147.

The databases 145, 146 may be representative of a plurality of databases, as can be appreciated. The data stored in the database 145, for example, is associated with accounts of various clients 110 that may interact with system 140, one or more processor units 132, etc. The data stored in the database 146, in another example, is associated with the various processor units 132 included in the multi-unit hub 130. The user account data 145 includes various information regarding register users, for example, name, security credentials, device preferences, and/or other data related to registered users accessing the multi-unit hub 130. The processor unit data 146 includes data related to the processor units 132 on the multi-unit hub 130 including identifier data, manufacture data, processor specification data, and/or any other information related to each of the processor units 132.

The multi-unit controller 144 is executed on a processor 147 to provide remote user access, via one or more networks 120, to one or more of the processor units 132 configured within a multi-unit hub 130. In addition, the multi-unit controller 144 may be used to determine which processor units 132 are available for executing certain applications, allocate certain available processor units to access by certain users, track and manage client access sessions, load various programs of instruction, including one or more mobile device operating systems, in the memory 136 corresponding to each of the processor units 132, store results of tests running on the processor units 132, send peripheral device data to the processor units 132, etc. For example, the multi-unit controller 144 may communicate with each of the processor units 132 via the network communications interface 138 on the multi-unit hub 130 to determine processor unit 132 availability for remote access, to instruct processor units 132 to interact with particular clients 110, etc.

Clients 110 are representative of one or more client devices that may be coupled to the network 120 and support one or more end-users (referred to interchangeably hereinafter as "users") 101 and access by same to various components over network 120. A client 110 can comprise, for example, a computer system supporting one or more users 101. Such a computer system may be embodied in the form of a desktop computer, a laptop computer, personal digital assistants, cellular telephones, smartphones, or other devices with like capability. The client 110 can include a display interface 112. The display interface 112 can comprise, for example, one or more devices such as liquid crystal display (LCD) displays, gas plasma-based flat panel displays, organic light emitting diode (OLED) displays, LCD projectors, or other types of display devices, etc.

The client 110, in some embodiments, can execute various programs of instructions including a client application 113. The client application 113 may be executed in a client 110, for example, to access one or more portions of mobile device functionality of a processor unit 132 on a multi-unit hub 130 via network 120, thereby rendering a user interface 114 on the display 112. The user interface 114 presented on the display interface 112 can, in some embodiments, include a mobile device user interface that corresponds to a user interface presented on a display of a mobile device, of which the processor unit 132 being accessed by client 110 comprises a limited selection of components thereof. To this end, the client application 113 can comprise a browser, a dedicated application, etc. The client 110 can, in some embodiments, execute applications beyond the client application 113 such as, for example, email applications, social networking applications, word processors, spreadsheets, and/or other applications.

In some embodiments, system 100 enables a user to access mobile device functionality associated with a particular mobile device via a network connection and receive a mobile device user interface, corresponding to the particular mobile device, on a client display, where the interface is presented based on the user's access to and interaction with the various mobile device functionality. The mobile device functionality can be executed by a processor unit that includes a limited selection of components of the particular complete mobile device, where the limited selection of components is a selection of the mobile device components that can execute one or more programs of instructions of the particular mobile device. User access to the processor unit can be managed and regulated by a management system. In the illustrated embodiment, for example, a client 110 supporting a user may interact with management system 140 via network 120 to request access to a processor unit 132. The controller 144 in the management system 140 may grant access by client 110 to a particular processor unit 132 based on one or more of authenticating user authorization to access processor units via database 145, identifying an available processor unit 132 that satisfies the request via database 146, and can track a remote access session via communication with one or more of the processor units 132, clients 110, etc. . . . . For example, controller 144 can restrict access sessions by a client 110 with a processor unit 132 to a particular duration, to a particular quantity of interactions between the client 110 and processor unit 132, including a particular limited quantity of programs of instructions that the client 110 can command the processor unit 132 to execute, etc.

Figure 2:
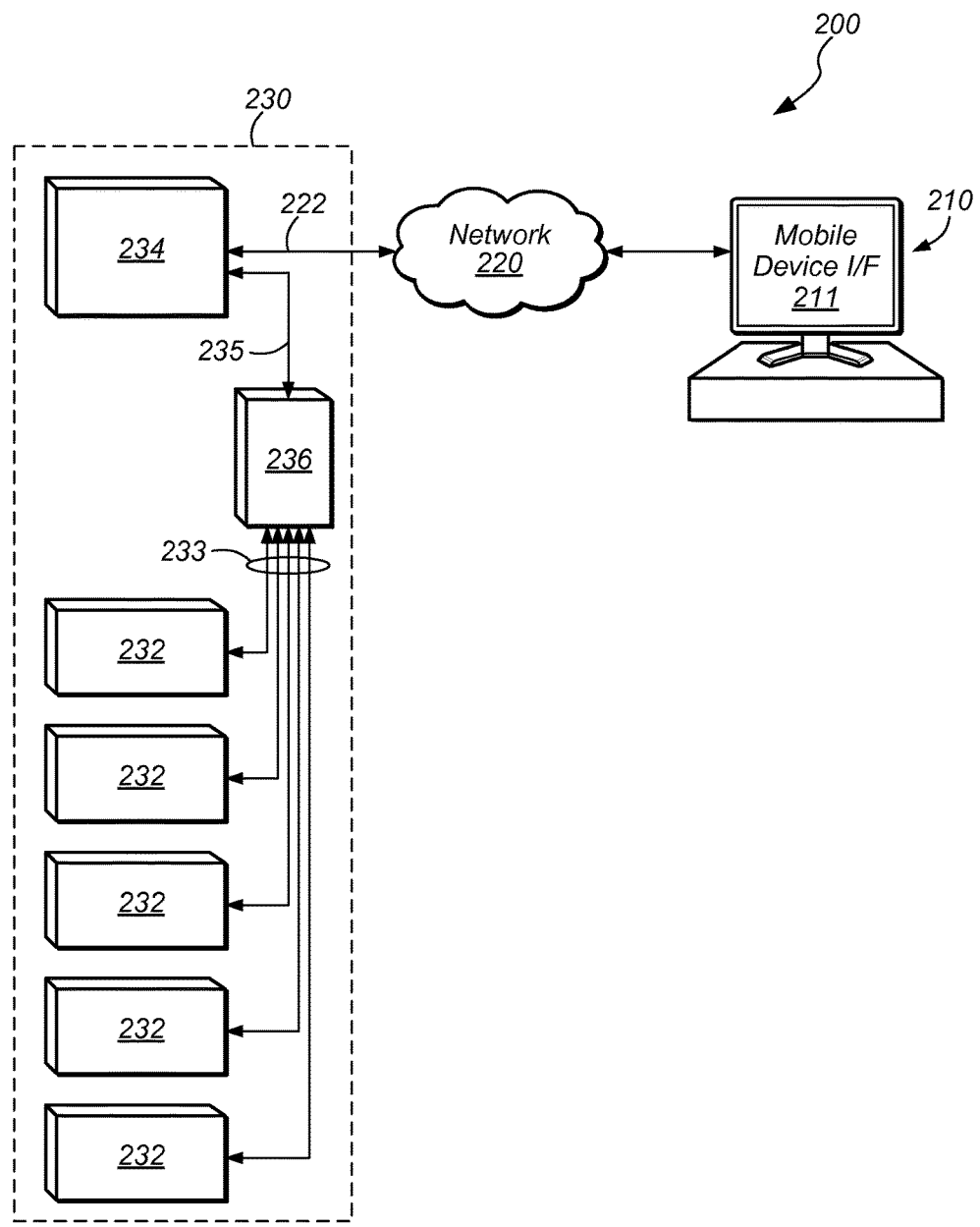
FIG. 2 is a schematic diagram that illustrates communicatively coupling one or more of a set of mobile device processor units in a multi-unit hub to a client device supporting an end-user via a reverse tethering connection with a computer system according to some embodiments.

FIG. 2 is a schematic diagram that illustrates communicatively coupling one or more of a set of mobile device processor units in a multi-unit hub to a client device supporting an end-user via a reverse tethering connection with a computer system according to some embodiments. The mobile device processor units, hubs, client devices, networks, etc. illustrated in FIG. 2 can include one or more of the processor units, hubs, clients, networks, etc. illustrated and discussed above with reference to at least FIG. 1.

In some embodiments, a multi-unit hub includes multiple various components that are communicatively coupled to enable remove user access to various processor units in the hub. Such various components can include components that, when coupled together, enable a communicative coupling of one or more processor units with a network to which a client device supporting the user is also communicatively coupled. The various components in the hub can be included in a common support chassis.

In some embodiments, one or more processor units installed in a multi-unit hub individually lack components to enable directly coupling the processor units with a network, and a coupling of such processor units with a network can be enabled via a connection between the processor units and a device that is communicatively coupled to the network, where the processor units can be coupled to the network via a reverse-tethering connection with the device. The device can establish reverse-tethering connections with multiple processor units to enable the multiple processor units to be coupled to the network.

In the illustrated embodiment, for example, system 200 includes a multi-unit hub 230 of processor units 232 that lack network communication components and are communicatively coupled with a network 220 via a reverse tethering connection with device 234. The network 220 may also be connected with a client device 210 supporting one or more users, enabling the users to access and interact with one or more of the processor units 232 via the network 220 and device 234.

Device 234 can include a computer system that includes one or more network communication components, including network interfaces, network communication adapter devices, radios, etc. that enable the device 234 to be communicatively coupled to a network 220 via link 222. Link 222 can include a cable connection with a network interface port on device 234, a wireless connection with a wireless radio in device 234, etc. Device 234 can include a computer system, as discussed further below. Device 234 can include one or more communication interfaces, including connectors, ports, etc. through which a reverse tethering connection can be established with processor units 232 via one or more connectors 233, 235. For example, such ports can include one or more USB ports, where a USB connection between a USB port of device 234 and USB ports of processor units 232, via USB cables 233, 235, can enable a reverse tethering of the link 222 between device 234 and network 220 to processor units 232 via cables 233, 235.

In some embodiments, an expander device can enable a given device to establish reverse tethering connections with a greater number of processor units than the device has physical interfaces to support such a number of discrete connections. For example, in the illustrated embodiment, device 234 may include a single port with which to establish a reverse tethering connection with processor units 232, and expander 236 can couple with the multiple processor units connector 235 via individual connectors 233 and can couple with the device 234 via connector 235, so that reverse tethering connections can be established between device 234 and multiple processor units 232 via a lesser number of interfaces in the device 234 than there are processor units 232 in the multi-unit hub 230. In some embodiments, additional devices 234 can be included in a multi-unit hub to enable sufficient numbers of reverse tethering connections to various processor units 232 in the hub 230.

In some embodiments, one or more processor units 232 are communicatively coupled to network 220 via one or more pathways communicatively coupling the processor units 232 with a computer system 234 which acts as a bridge component to bridge the communicative coupling of the processor units 232 and the network 220. In some embodiments, a reverse tethering connection between computer system 234 and one or more processor units 232, via one or more connections 235, 233, enables the communicative coupling of the processor units 232 and the network 220 via the computer system 234. In some embodiments, one or more processor units 232 are communicatively coupled with a network 220 based at least in part upon a bridged network connection between the processor units 232 and the network 220 via a host computer system 234 which acts as a bridge, where the processor units 232 are granted access to the network, via the bridged connection across connections 233, 235, 222 and computer system 234, by one or more various network protocols. Such various network protocols will be understood to encompass network protocols that are known in the relevant art, including Bluetooth protocols, Internet protocol suite protocols, System Network Architecture protocols, File Transfer Protocols, Routing protocols, IEEE 802.11 protocols, IEEE 1394 protocols, IEEE 488 protocols, USB protocols, etc.

In some embodiments, a computer system in a hub that is communicatively coupled with one or more processor units in the hub administers one or more of the processor units in the hub. Such administering can include bridging a connection between the processor units and a communication network. In some embodiments, such administering is independent of bridging a connection between the processor units and a network, where the processor units may be communicatively coupled with the network via a connection with a separate computer system used as a bridging component, via a separate network communication connection, etc. Administering can include diagnosing faults in some or all of the processor units, including faults in one or more of the mobile device components included in one or more of the processor units. In some embodiments, administering processor units includes managing one or more portions of one or more of the processor units. Such management can include management of processor units as illustrated and discussed above with reference to system 140 in FIG. 1, monitoring various parameters associated with the processor units, including temperature, processor performance, etc.

In some embodiments, device 234 includes one or more adapter devices that enable processor units to provide display signals to client devices 210, via network 220, to enable the client devices 210 to present a mobile device user interface 211 to one or more users. For example, device 234 can include a display adapter device that can process signals from one or more processor units 232, received via connectors 233, 235, to generate one or more display signals that can be transmitted to client device 210 via network 220 to enable the client device 210 to display a mobile device user interface that corresponds to execution of one or more mobile device programs of instructions on the one or more processor units 232.

Figure 3:
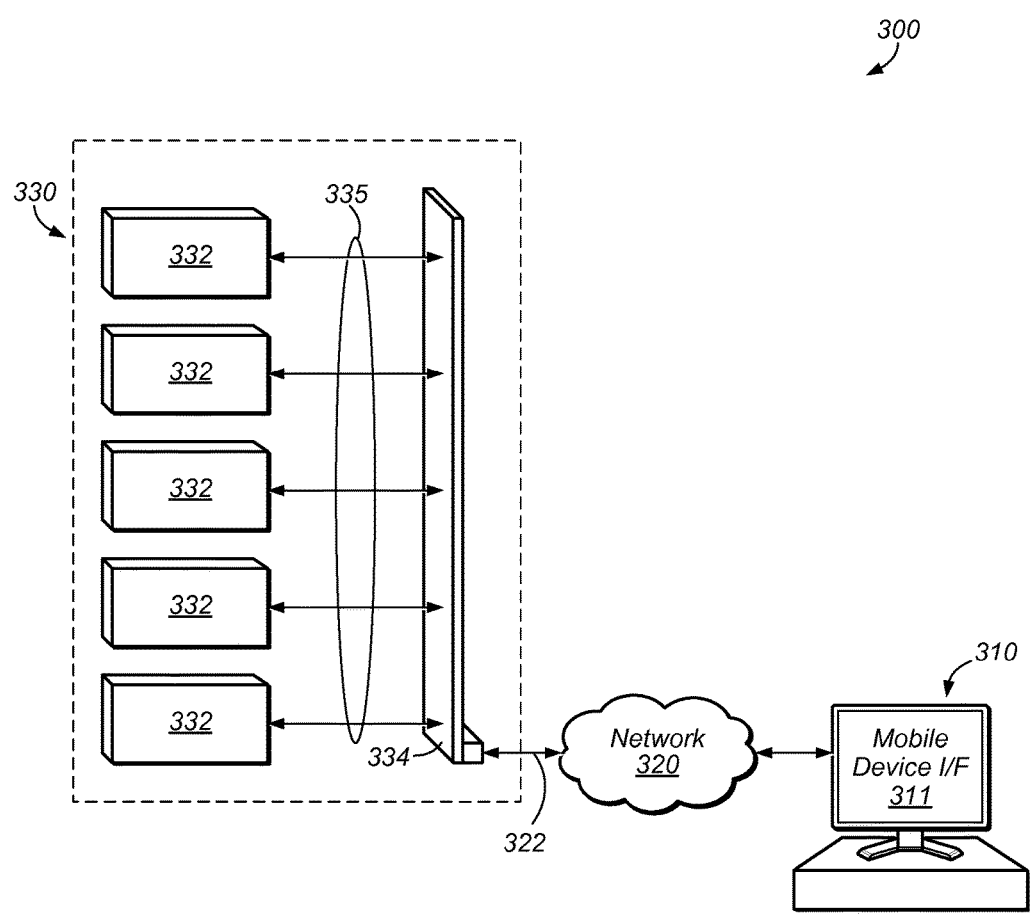
FIG. 3 is a schematic diagram that illustrates communicatively coupling each mobile device processor unit of a set of mobile device processor units to a client device supporting an end-user via coupling each mobile device processor unit with a backplane circuit board that is coupled to a communication network.

FIG. 3 is a schematic diagram that illustrates communicatively coupling each mobile device processor unit of a set of mobile device processor units to a client device supporting an end-user via coupling each mobile device processor unit with a backplane circuit board that is coupled to a communication network. The mobile device processor units, hubs, client devices, networks, etc. illustrated in FIG. 3 can include one or more of the processor units, hubs, clients, networks, etc. illustrated and discussed above with reference to at least FIG. 1-2.

In some embodiments, a multi-unit hub includes one or more processor units that can individually communicatively couple with one or more communication networks, so that. For example, the processor unit can include, along with a limited selection of mobile device components of a complete mobile device, a network communication adapter device, which can be coupled to one or more of the mobile device components, which enables the set of mobile device components to be communicatively coupled to a communication network. In some embodiments, the network communication adapter device is included in the limited selection of mobile device components. In some embodiments, the limited selection of mobile device components includes a wireless communication interface, including a wireless radio, which enables the set of mobile device components to be communicatively coupled to a communication network via a wireless communication pathway.

In the illustrated embodiment, for example, system 300 includes a multi-unit hub 330 including multiple processor units 332 that each can couple with a communication network 320 via an individual network connector 335. Each processor unit 332 can include an individual network interface, which can include an Ethernet interface device, circuit board, card, etc., which enables the individual processor unit 332 to communicatively couple with a communication network 320 via the network interface.

In some embodiments, a multi-unit hub includes one or more intermediary devices to which one or more processor units can couple to communicatively couple the processor units to a communication network. The intermediary devices can include a backplane circuit board that includes a network hub device, a network switch device, etc. In the illustrated embodiment, for example, hub 330 includes a backplane circuit board 334 with which each of the processor units 332 can couple, via network connectors 335, where the backplane circuit board 334 is coupled with network 320 via connector 322, to communicatively couple the processor units 332 to network 320, enabling remote access to, and interaction with, one or more of the processor units by a remotely located user via client device 310, mobile device user interface 311, and network 320.

Figure 4:
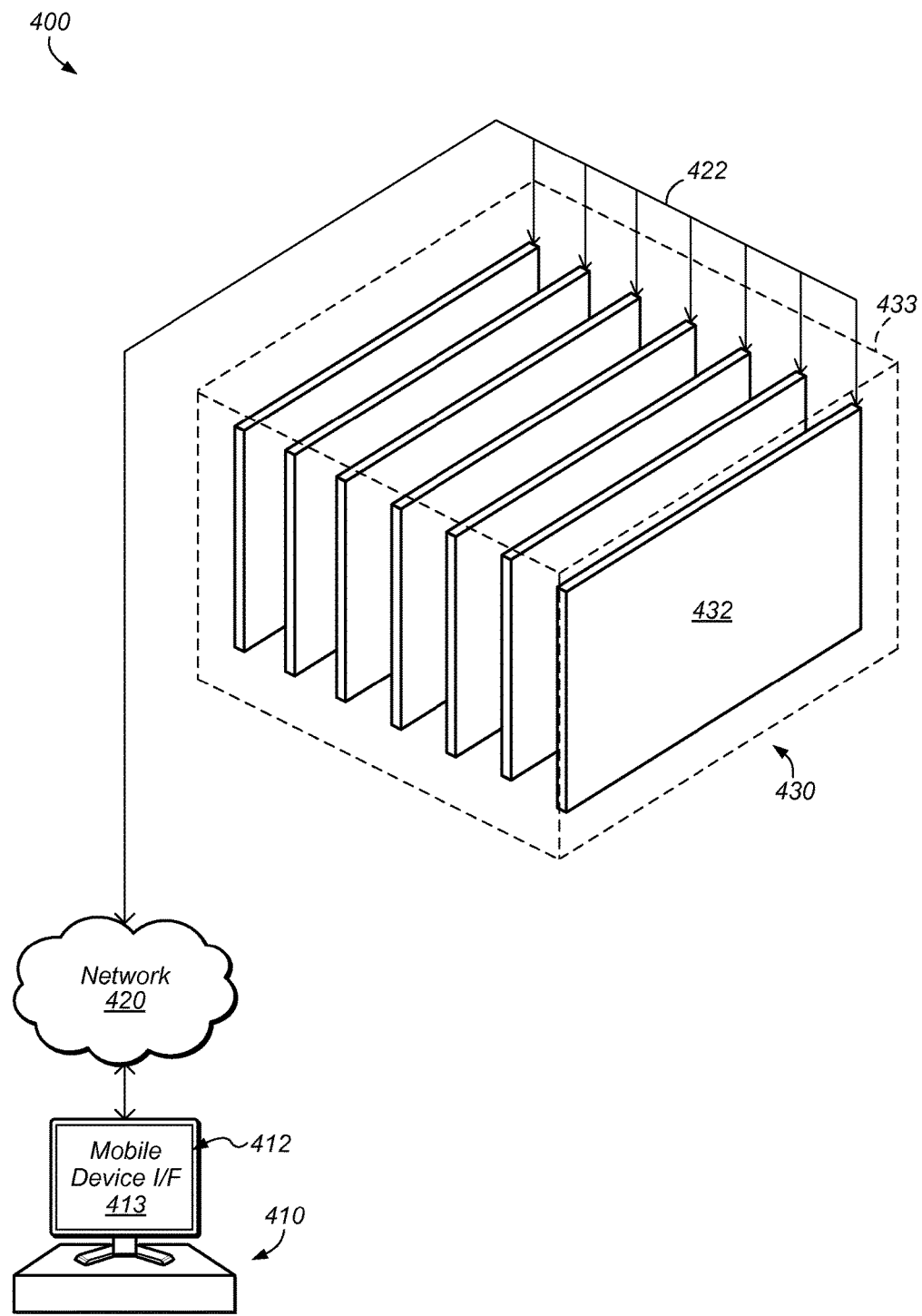
FIG. 4 illustrates a schematic diagram of communication between one or more mobile device processor units of a set of mobile device processor units installed in a support chassis and a client device supporting an end-user to present a mobile device interface on the client device according to some embodiments.

FIG. 4 illustrates a schematic diagram of communication between one or more mobile device processor units of a set of mobile device processor units installed in a support chassis and a client device supporting an end-user to present a mobile device interface on the client device according to some embodiments. The mobile device processor units, chassis, hubs, client devices, networks, etc. illustrated in FIG. 4 can be implemented in one or more of the processor units, hubs, clients, networks, etc. illustrated and discussed above with reference to at least FIG. 1-3.

System 400 includes a client device 410 supporting one or more users, a multi-unit hub 430 supporting multiple processor units 432, and a communication network 420 through which the client device 410 is communicatively coupled with one or more of the processor units 432 in the hub 430.

In some embodiments, a multi-unit hub includes a support chassis that provides one or more of structural support, communication coupling support, power support, etc., to one or more processor units. The processor units may be installed in the chassis, where structural members of the chassis provide structural support and protection to the processor units and connectors included in the chassis provide communicative coupling with a network, power from a power supply, etc.

In the illustrated embodiment, for example, multi-unit hub 430 can include a mobile device unit support chassis (referred to interchangeably hereinafter as simply a "support chassis") 433 which supports multiple individual processor units 432 in the hub 430. The chassis 433 can include structural members which provide structural support and stabilization of the individual processor units 432. The chassis 433 can include one or more sets of connectors that can each couple with one or more of the processor units to communicatively couple the processor units with one or more external systems, services, etc. For example, chassis 433 can include a network connector 422 that can couple with one or more of the processor units 432 to communicatively couple the processor units 432 to network 420. Chassis 433, in some embodiments, includes one or more other components, including power connectors that couple with processor units 432 to provide power to the processor units from one or more power supplies, adapter devices, expander devices, etc.

In some embodiments, a client device enables a supported user to access and interact with one or more processor units in a multi-unit hub via a network. The client device can receive and present the user with a user interface that corresponds to a mobile device, based on data received from one or more processor units. In the illustrated embodiment, for example, a client device 410 can include a computer system that has a display 412 that can present a mobile device user interface 413 that corresponds to a user interface that is presented on a display of a particular mobile device. The user interface 413 can be associated with one or more particular processor units 432 executing particular programs of instruction, where the particular processor units 432 include components that correspond to at least some components of a particular mobile device. As a result, the client 410 can enable a user to communicate with a processor unit 432, via a network, to command the processor unit to execute one or more mobile device programs of instructions of a particular mobile device, and the client can present a user interface of that particular mobile device on a display 412, where the interface that is presented reflects the execution of the commanded programs. For example, where a user interacts with an interface 413 to command the processor unit 432 to initialize a particular mobile device application, the interface 413 may present a visual representation of the mobile device application based at least in part upon the processor unit 432 initializing the application. The interface may be presented on client device display 412 based on one or more signals generated at one or more processor units 432, which can include display signals. In some embodiments, the display signals are generated by a display adapter device which may be located external to one or more processor units 432, where the display adapter device can generate display signals for different clients 410 based on input signals from different processor units 432.

In some embodiments, different processor units in a multi-unit hub comprise components that correspond to components of different complete mobile devices. As a result, a client 410 accessing a particular processor unit 432 may be able to interact with functionality associated with one particular mobile device, and accessing another separate processor unit 432 may enable the client 410 to interact with different functionality associated with a different particular mobile device, based on the components included in the respective processor units 432.

Figure 5:
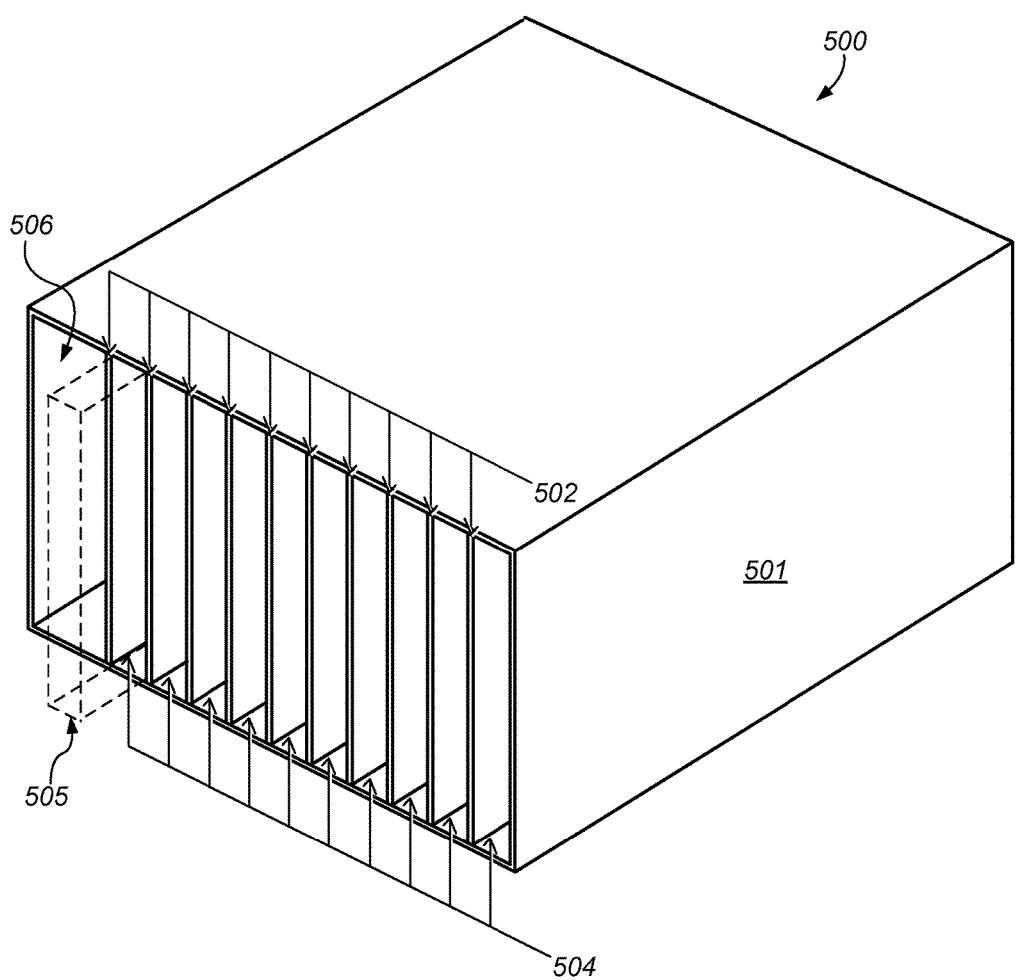
FIG. 5 illustrates a perspective view of a front end of a mobile device unit support chassis that includes various slot spaces to receive and support various processor units and computer systems according to some embodiments.

FIG. 5 illustrates a perspective view of a front end of a mobile device unit support chassis that includes various slot spaces to receive and support various processor units and computer systems according to some embodiments. The chassis, devices etc. illustrated in FIG. 5 can be implemented in one or more of the multi-unit hubs, processor units, support chassis, etc. illustrated and discussed above with reference to at least FIG. 1-4.

Support chassis 500 includes a housing 501, dividers 502, and various slot spaces (referred to interchangeably hereinafter as simply "slots") 504, 506 in which one or more various devices 505 can be installed.

In some embodiments, a chassis housing is established based on coupling various structural members to establish at least a partial enclosure. In the illustrated embodiment, for example, housing 501 can be established based on coupling at least two horizontally-oriented structural members and at least two vertically-oriented structural members to establish an enclosure with side ends, a top end, and a bottom end. The housing 501 can provide structural support, stabilization, and at least some protection from external forces to various devices received into the enclosure.

In some embodiments, a chassis includes various slots into which components can be installed, so that the devices are structurally supported and communicatively coupled to one or more systems, services, etc. that are external to the chassis ("external services, systems, etc."). A slot can include a portion of the chassis enclosure that is partitioned via various divider structural members (hereinafter "dividers"). The slot can be sized, based on the positions of various dividers in the chassis enclosure, to support certain devices having certain structural dimensions. In the illustrated embodiment, for example, chassis 500 includes various slots 504, 506 that are established in a chassis enclosure by portions of the housing 501 and various dividers 502 installed in the enclosure. As also illustrated, a device 505 can be inserted into a slot 504, where the housing 501 and dividers 504 cooperate to provide at least structural support and stability to the device 505 in the chassis enclosure. In some embodiments, a device 505 includes a processor unit, computer system, etc. A device 505 can be inserted into a slot via sliding the device 505 into the slot via an open end of the slot. In the illustrated embodiment, for example, where housing 501 does not enclose at least a front end of the chassis 500, device 505 can be slidably inserted into a slot 504 via sliding the device 505 through the front end of the chassis. Various structural members establishing the slot 504, including adjacent dividers 502 and housing 501 members, can guide the device 505 into the slot 504.

In some embodiments, slots in a chassis can be sized differently to accommodate different types of devices. For example, in the illustrated embodiment, slots 504 may be sized to accommodate particular processor units, as discussed further below, and slot 506 may be sized to accommodate a computer system, which may occupy a greater amount of volume than a processor unit 505. The sizing of the slot may be implemented through coupling the various dividers 502 at different locations in the enclosure of the housing 501 to establish different widths, depths, heights, etc. of various slots in the chassis enclosure. In some embodiments, chassis 500 includes horizontal dividers (not shown) which can couple to one or more housing 501 members, dividers 502, etc. to establish one or more slots having a height less than the enclosure at least partially enclosed by the housing 501.

Figure 6A:
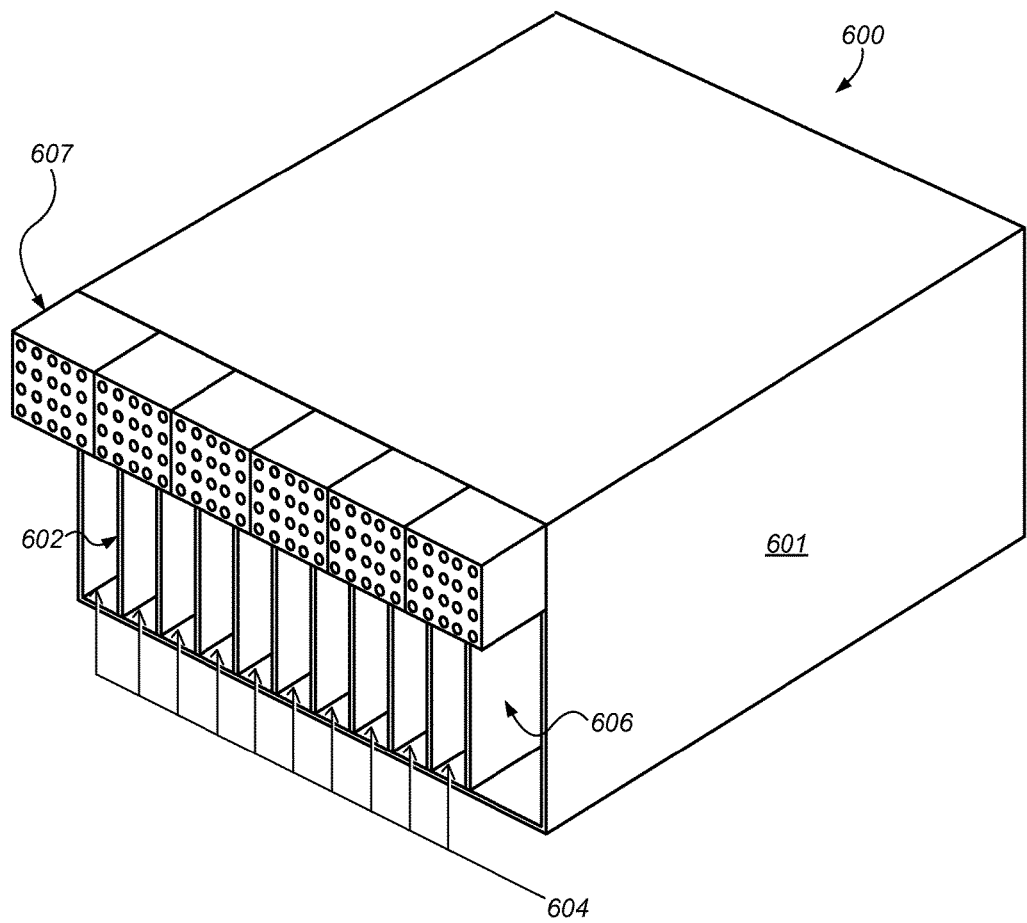
FIG. 6A illustrates a perspective view of a rear end of a mobile device unit support chassis that includes various slot spaces to receive and support various processor units and computer systems and various air moving devices installed at the rear end according to some embodiments.

FIG. 6A illustrates a perspective view of a rear end of a mobile device unit support chassis that includes various slot spaces to receive and support various processor units and computer systems and various air moving devices installed at the rear end according to some embodiments. The chassis, devices etc. illustrated in FIG. 6A can be implemented in one or more of the multi-unit hubs, processor units, support chassis, etc. illustrated and discussed above with reference to at least FIG. 1-5.

Support chassis 600 includes a housing 601, dividers 602, various slots 604, 606 which can receive and support one or more various devices, and an array of air moving devices 607 that can induce air flow through the slots to cool components supported in the slots.

In some embodiments, air moving devices 607 can be coupled to one or more ends of a chassis and can operate to induce airflow through one or more slots in the chassis, where the airflow through a given slot can remove heat from one or more components of one or more devices installed in the slot. Air moving devices can be coupled to the chassis individually, as part of an array of air moving devices, etc.

Air moving devices can be coupled to a front end of the chassis, a side end, a top end, bottom end, some combination thereof, or the like. In the illustrated embodiment, for example, an array of air moving devices 607 is coupled to a rear end of a chassis 600. Various devices, including processor units, computer systems, etc. may be installed in various slots 604, 606, and the air moving devices 607 can operate to induce airflow through one or more of the slots to cool various heat producing components included in devices supported in the one or more slots.

In some embodiments, various amounts of airflow are induced through various separate slots, based at least in part upon various couplings of air moving devices to the support chassis. For example, where a slot 606 is configured to receive and support a computer system, as opposed to a processor unit, and where the computer system has greater cooling requirements than a processor unit, which may be supported in a slot 604 configured to receive and support the processor unit, additional air moving devices 607 may be coupled to the chassis 600 to induce airflow through slot 606, relative to the air moving devices 607 coupled to the chassis 600 to induce airflow through one or more various slots 604.

Figure 6B:
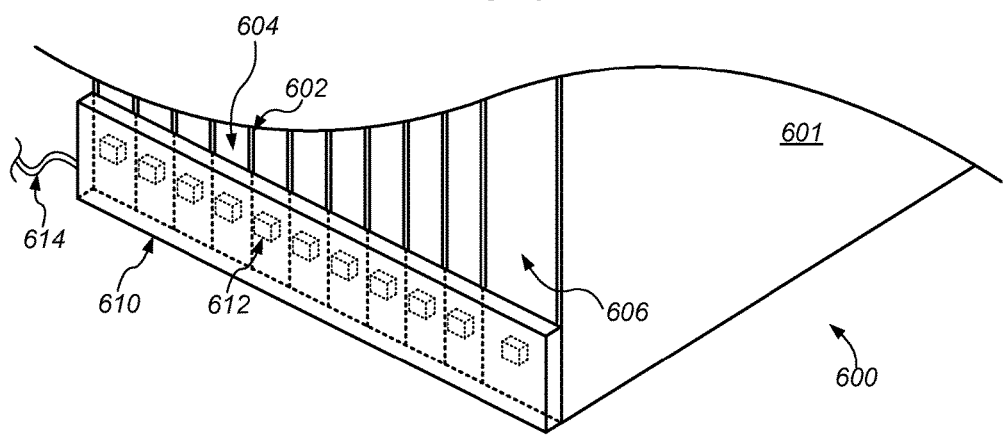
FIG. 6B illustrates a perspective view of a portion of a rear end of a mobile device unit support chassis that includes various slot spaces to receive and support various processor units and computer systems and a backplane circuit board that includes various connectors corresponding to various slot spaces according to some embodiments.

FIG. 6B illustrates a perspective view of a portion of a rear end of a mobile device unit support chassis that includes various slot spaces to receive and support various processor units and computer systems and a backplane circuit board that includes various connectors corresponding to various slot spaces according to some embodiments. The chassis illustrated in FIG. 6B can be implemented in one or more of the multi-unit hubs illustrated and discussed above with reference to at least FIG. 1-6A.

In some embodiments, a chassis includes one or more intermediary devices that enable various devices installed in one or more chassis slots to be communicatively coupled to one or more external services, systems, etc. Such external services, systems, etc. can include one or more communication networks, one or more power distribution systems, etc.

In some embodiments, a device that is received into a slot can be coupled with an intermediary device that includes a backplane circuit board assembly ("backplane") via coupling with one or more connectors included in the backplane. Where the backplane is communicatively coupled to an external service, system, etc., coupling the device with the backplane connector can communicatively couple the device with the external service, system, etc. In the illustrated embodiment, backplane 610, coupled with chassis housing 601, includes a link 614 to one or more external services, systems, etc. and various connectors 612 corresponding to various slots 604, where one or more connectors 612 are aligned with one or more particular slots 604 so that a device, including a processor unit, that is inserted into and supported in the one or more particular slots can be coupled to the connectors 612 to communicatively couple the device to the external system, service, etc. via link 614 of the backplane 610. Where a device is inserted, received, etc. into a slot so that the device is supported by structural members establishing the slot and is communicatively coupled to one or more external systems, services, etc. via coupling with one or more connectors that correspond to the slot, the device may be understood to be "installed" in the slot. Installing a device in a slot can include sliding the device into one end of the slot, where a connector on the device couples with a backplane connector 612 on another end of the slot as the device is inserted into the slot and structural members establishing the slot 604 transmit at least some of the structural load of the device through the chassis. In some embodiments, multiple backplanes are coupled to a chassis. Where multiple backplanes are coupled to a chassis, each backplane can include connectors which couple devices installed in the chassis slots with various external systems, services, etc. For example, one backplane coupled to a chassis can include power connectors which electrically couple devices installed in a slot to an external power supply, another backplane coupled to the chassis can include network communication connectors which communicatively couple device installed in the slot to an external communication network, etc. Separate backplanes can be coupled to a common side of the chassis and can be arranged vertically, horizontally, etc. relative to each other.

In some embodiments, a backplane can include additional components that enable communicative coupling of processor units, computer systems, etc. that are installed in one or more slots with one or more external systems, services, etc. For example, a backplane 610 can include a display adapter device that can, based at least in part upon data received from one or more processor units via connectors 612, generate display signals that can be transmitted to a client device via a link 614 to a communication network to present a mobile device user interface to a user via a display of the client device. In another example, backplane 610 can include one or more network communication adapter devices that can enable one or more processor units coupled to the backplane 610 via one or more connectors 612 to be communicatively coupled to a communication network via link 614. In some embodiments, a backplane 610 can include a computer system, as discussed further below.

In some embodiments, a chassis is free from including connectors, and devices received and supported in various chassis slots can be communicatively coupled to various external systems, services, etc. via coupling with various external connectors, cables, etc. that are external to the chassis and couple to the devices via open ends of the chassis slots. In the illustrated embodiments of FIG. 5-6, for example, where the front and rear ends of the slots in chassis 500, 600 are open, connectors can be inserted into the slots via the open ends to couple with one or more processor units, computer systems, etc. supported in the respective slots.

Figure 7A:
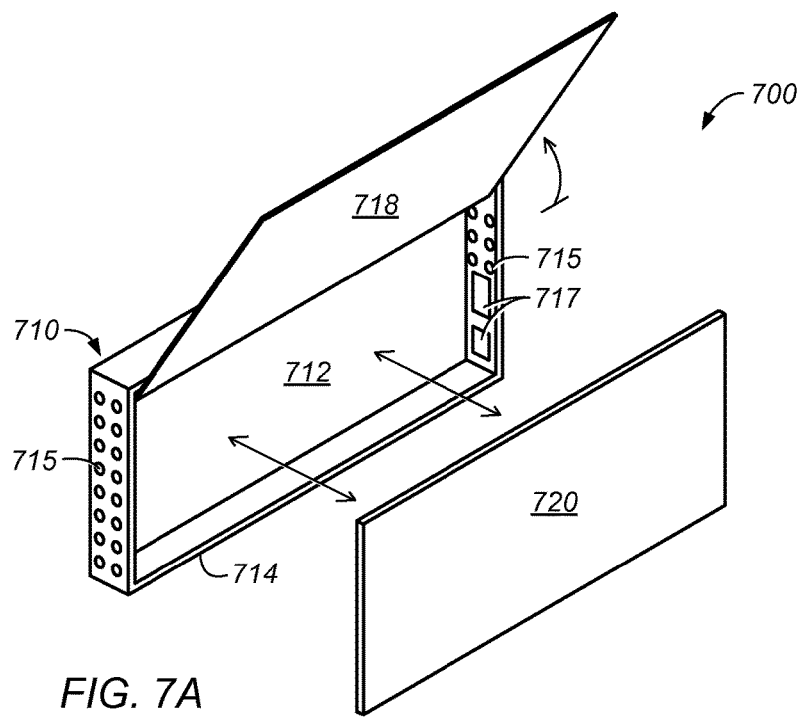
FIG. 7A-C illustrate perspective views of a processor unit case in which a mobile device processor unit can be installed according to some embodiments.
Figure 7B:
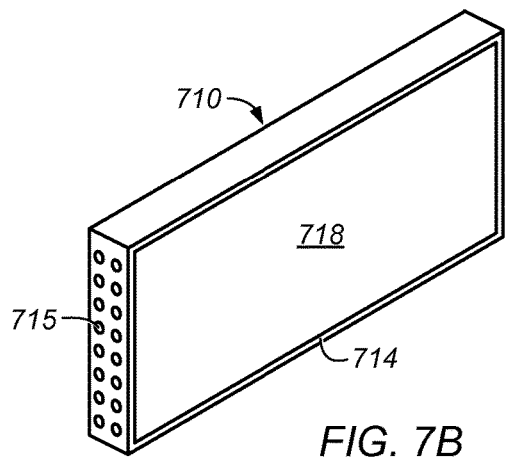
Figure 7C:
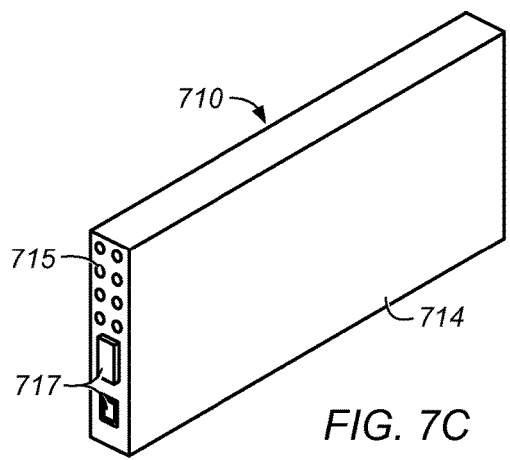

FIG. 7A-C illustrate perspective views of a processor unit case in which a mobile device processor unit can be installed according to some embodiments. The processor unit, processor unit case, etc. illustrated in FIG. 7A-C can be implemented in one or more of the multi-unit hubs, processor units, etc. illustrated and discussed above with reference to at least FIG. 1-6.

In some embodiments, one or more processor units can be installed in one or more processor unit cases, and the processor unit cases can be installed in one or more slots of a support chassis, to communicatively couple the processor units to one or more external services, systems, etc., including a communication network. The processor unit case can provide structural support and stabilization of a processor unit and can enable communicative coupling of the processor unit with one or more external services, systems, etc. In some embodiments, a processor case can enable cooling of various components included in the processor unit, processor unit case, etc.

In the illustrated embodiment of FIG. 7A, a processor unit case system 700 includes a processor unit case 710 and a processor unit 720. The processor unit case 710 includes a housing 714, an interior enclosure 712 of the housing, at least some ventilation ports 715 on one or more ends of the processor case housing 714, interfaces 717 on at least one end of the processor case housing 714, and a hatch 718 that can rotate to expose or enclose the interior enclosure 714. As shown, the processor unit 720 can be inserted into the interior enclosure 712 of the processor case housing 714. In some embodiments, inserting the processor unit 720 into the enclosure 712 includes coupling one or more interfaces of the processor unit 720, including power connectors, communication connectors, etc. with corresponding interfaces 717 of the housing 714 to enable the processor unit 720 to be communicatively coupled to one or more external systems, services, etc. via the interfaces 717 of the processor unit case. In some embodiments, interfaces 717 include open gaps in the housing 714, and interfaces of the processor unit 720 can be communicatively coupled to external services, systems, etc. directly via connectors that couple with the processor unit 720 interfaces through the gaps 717.

In some embodiments, processor unit case 710 includes an interior enclosure 712 that, in cooperation with one or more ventilation ports 715 in one or more sides of the processor case housing 714, establishes one or more air passages through the interior enclosure 712. When a processor unit 720 is installed in the interior enclosure 712, the air passages can direct airflow through the interior enclosure 712 to remove heat from various components included in the processor unit 720.

In some embodiments, a processor unit case includes one or more sets of mounting elements that can couple to a processor unit installed in the processor case to hold the installed processor unit in place. For example, processor unit case 710 can include one or more mounting elements in enclosure 712 that can couple with processor unit 720 when processor unit 720 is inserted into the enclosure 712 to hold the processor unit 720 in place within the processor case 710, thereby providing structural support and stability to the processor unit 720 within the processor unit case 710.

As shown in FIG. 7A, a processor unit case 710 can include a hatch 718 that can rotate to an open position to expose the interior enclosure 712 to enable a processor unit to be installed or uninstalled in the enclosure 712. As shown in FIG. 7B, a processor unit case can include a hatch 718 that can rotate to a closed position to enclose the enclosure 712. When a processor unit 720 is installed in the enclosure, the hatch 718 can rotate to the closed position to provide at least some structural support and protection to the processor unit 720 from external forces, including side shocks, particulate matter, etc. In some embodiments, the hatch 718 can enclose the interior enclosure 712 to establish an air passage through the enclosure 712 between ventilation ports 715 on separate ends of the case 710, enabling cooling of components included in the installed processor unit 720 in the enclosure 712.

As shown in FIG. 7C, an outer surface of a processor unit case can include one or more interfaces 717 that can be coupled to one or more connectors to communicatively couple a processor unit 720 installed in the interior enclosure 712 of the processor unit case 710 with one or more external services, systems, etc. In some embodiments, the interfaces 717 include connectors to the enclosure 712 and connectors to an external environment from the case 710, so that a processor unit 720 installed in the enclosure 712 can be coupled with one or more connectors to the enclosure, and the one or more connectors to the external environment can be coupled to one or more connectors of various external services, systems, etc., to communicatively couple the processor unit 720 to the various external systems, services, etc.

As shown in the illustrated embodiment, interfaces 717 can include separate interfaces that can communicatively couple the processor unit 720 installed in the enclosure 712 with separate external services, systems, etc. For example, one interface can include a communication interface, including a network connector, USB connector, Ethernet connector, etc., which can communicatively couple a processor unit to a communication network, intermediary device, etc., Another interface 717 can include a power interface which can communicatively couple a processor unit to a power supply.

In some embodiments a processor unit case can have structural dimensions that correspond to one or more form factors for a server rack. For example, the processor unit case can have a height that corresponds to a 3U rack height.

In some embodiments, interfaces 717 include open gaps in the housing 714, and interfaces of the processor unit 720 can be communicatively coupled to external services, systems, etc. directly via connectors that couple with the processor unit 720 interfaces through the gaps 717.

Figure 8A:
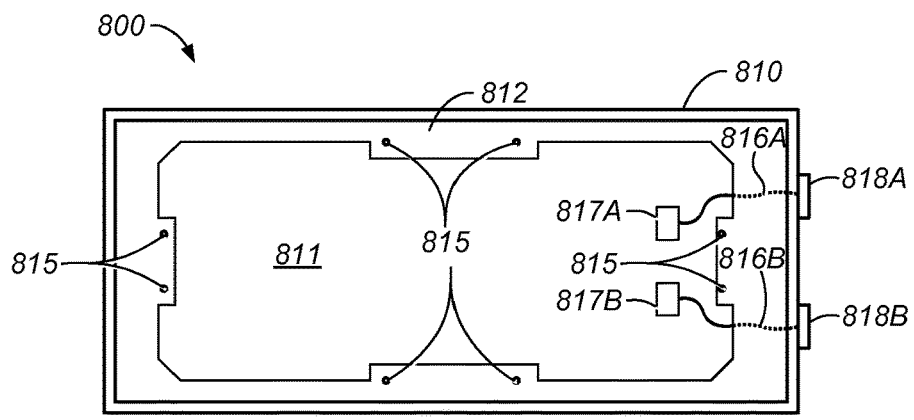
FIG. 8A-C illustrate a processor unit case and mobile device processor unit that can be installed in the processor unit case according to some embodiments.
Figure 8B:
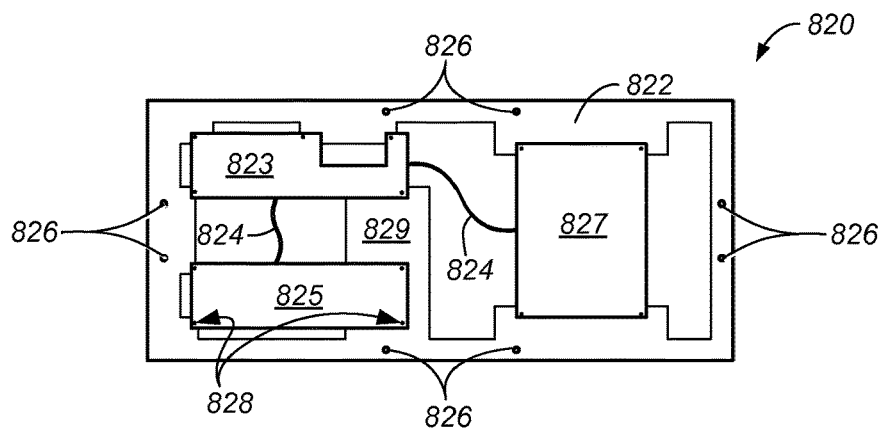
Figure 8C:
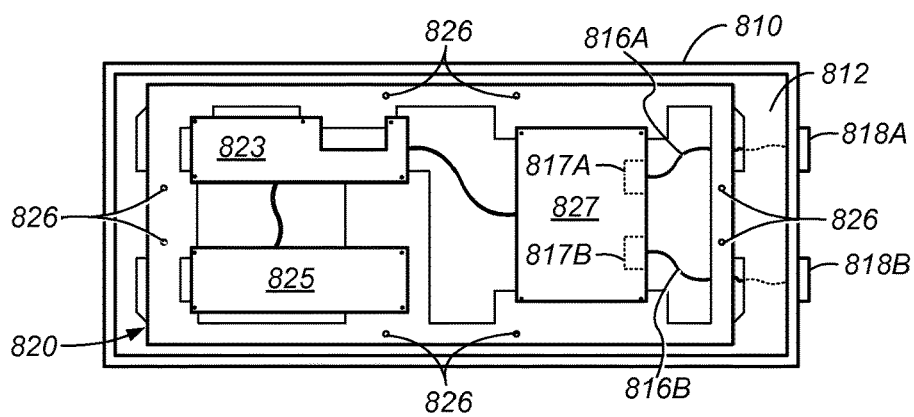

FIG. 8A-C illustrate a processor unit case and mobile device processor unit that can be installed in the processor unit case according to some embodiments. The processor unit, processor unit case, etc. illustrated in FIG. 8A-C can be implemented in one or more of the multi-unit hubs, processor units, etc. illustrated and discussed above with reference to at least FIG. 1-7.

FIG. 8A illustrates a housing 810 of a processor unit case 800. The processor unit case housing 810 includes a support structure 812, mounting elements 815, and interface elements 816-818. As shown, an interior enclosure 811 can include a support structure 812 that can provide structural support and stability to a processor unit installed in the enclosure 811 of the processor unit case housing 810. For example, a structure 812 can transmit structural loads of the processor unit and can hold the processor unit in place, via at least the mounting elements 815, to stabilize an installed processor unit against external forces including side shocks, vibrations, etc. Interface elements 816-818 can include internal connectors 817A-B, which can couple with one or more components included in a processor unit, external connectors 818A-B, which can couple with connectors to one or more various external services, systems, etc., and one or more communication pathways 816A-B that communicatively couple the internal and external connectors, so that a component coupled to an internal connector 817A, for example, can be communicatively coupled to an external service, system, etc. via pathway 816A and external connector 818A. In some embodiments, various sets of connectors and pathways communicatively couple components of a processor unit installed in the enclosure 811 with various different external services, systems, etc. For example, connector 817B may include a power connector that, when coupled with a power input of a component of a processor unit, communicatively couples the components of the processor unit to receive power from an external power supply via connector 817B and the corresponding pathway 816B and external connector 818B. In another example, connector 817A may include a communication connector that, when coupled with a communication interface of a component of a processor unit, communicatively couples the components of the processor unit with an external device, via connector 817A and the corresponding pathway 816A and external connector 818A.

FIG. 8B illustrates a processor unit 820. The processor unit 820 includes a support structure 822, which includes one or more case mounting elements 826 and component mounting elements 829.

In some embodiments, a processor unit includes a set of one or more components coupled to the support structure of the processor unit. The components can include one or more mobile device components that correspond to components included in a complete mobile device. The mobile device components can include a limited selection of mobile device components that are included in the complete mobile device. For example, a limited selection of mobile device components can include a processor and memory of a complete mobile device, while excluding a power supply, case, display interface, and display adapter device of the complete mobile device. In some embodiments, the components included in a processor unit include components independent of the mobile device components included in a complete mobile device. Such components, which can include a network communication adapter component, display adapter component, one or more communication interfaces, connectors, ports, etc., can be included in the components of the processor unit to enable remote user access and interaction with the mobile device components in the processor unit, for example to enable the mobile device components to receive user commands, execute one or more mobile device programs of instructions based on the received commands, and provide a mobile device user interface that corresponds to a user interface of the complete mobile device to a remote user over one or more communication networks. In some embodiments, one or more components included in a processor unit include mobile device components originally manufactured for inclusion in a complete mobile device, mobile device components removed from an initially complete mobile device, such as a damaged complete mobile device, components originally manufactured to test mobile device functionalities and not for inclusion in a complete mobile device, including engineering circuit boards, some combination thereof, or the like.

In FIG. 8B, processor unit 820 includes components 823, 825, 827. One or more of the components in processor unit 820 can include a limited selection of mobile device components of one or more particular complete mobile devices. One or more components can include one or more printed circuit boards (PCBs). One or more components can include additional components included to enable remote user access. For example, components 823, 825 can include mobile device components that are printed circuit boards corresponding to printed circuit boards of a complete mobile device, where the printed circuit boards 823, 825 include one or more of a processor, memory, wireless transceiver, some combination thereof, or the like of the complete mobile device. One or more components of the processor unit 820 can include components not included in the complete mobile device. For example, component 827 may include a network communication adapter device configured to communicatively couple components 823, 825 with a communication network via a network connection. Component 827 can include a display adapter device that can process output signals from components 823, 825 to generate display signals that can be transmitted to a remote user via a network connection. Component 827 may include one or more interfaces, including a power input interface, communication connector interface, etc. As shown by wires 824, the various components 823, 825, 827 in processor unit 820 are communicatively coupled and can interact to perform various functions, including receiving and processing communications from remote sources, executing various mobile device programs of instruction, and generating output signals based on such executions, including display signals corresponding to mobile device user interfaces.

In some embodiments, components included in a processor unit are coupled to the support structure of the processor unit. The support structure may be shaped to correspond to coupling points 828 of the components. Conversely, the components may be shaped to correspond with coupling points 828 to coupling points of the support structure. In the illustrated embodiment, for example, components 823, 825, 827 have shapes corresponding to the shapes of mobile device components included in a complete mobile device, and support structure 822 is shaped to couple with coupling points 828 included in the components. For example, support structure 822 includes a spur structure 829 that enables coupling of coupling points 828 of components 823, 825 with support structure 822.

In some embodiments, processor unit 820 includes components coupled in one or more various arrangements. The arrangements, including the illustrated arrangement of components 823, 825, 827 coupled to support structure 822 via coupling points 828, can correspond to an arrangement of corresponding mobile device components in the complete mobile device. In some embodiments, the arrangement is based at least in part upon one or more air passages through the processor unit 820, where the one or more air passages can direct airflow through the processor unit 820 to remove heat from one or more of components 823, 825, 827.

FIG. 8C illustrates processor unit 820 installed in the interior enclosure 811 of processor unit case housing 810. The processor unit 820 is mounted in the enclosure 811 via mounting elements 826 of the processor unit 820 coupling with mounting elements 815 of the support structure 812 of the processor unit case 810. As a result, the support structure 812 can transmit the structural load of the processor unit 820 and can provide stability to the processor unit 820 from external forces, including impacts, side shocks, shock absorption, etc.

As shown in FIG. 8C, internal connectors 817A-B of the processor unit case housing 810 can be coupled to one or more components of the processor unit 820 that is mounted in the processor unit case 810 to communicatively couple the components 823, 825, 827 to external services, systems, etc. via external connectors 818A-B and pathways 816A-B of the processor unit case housing 810. As shown, the internal connectors 817A-B are coupled to component 827, which can include one or more interfaces, including power input interfaces, communication interfaces, etc. In some embodiments, one or more of the internal connectors 817A-B can include a power connector that is connected, via a respective pathway 816, to an external power connector 818 that can couple with a power supply. One or more of the internal connectors 817A-B can include a communication connector that is connected, via a respective pathway 816, to an external communication connector 818, which can include a USB port, USB connector, network port, network connector, etc.

In some embodiments, a processor unit can be removably mounted in a processor unit case, enabling field replaceability of the processor unit from the case. For example, upon failure or malfunction of one or more of the components, the entire processor unit can be replaced from the enclosure of the processor unit case and a new processor unit can be mounted in the enclosure to replace the original processor unit. In some embodiments, where one or more components of a complete mobile device is changed, upgraded, etc. over time, the processor units installed in a support chassis may be replaced to provide functionality corresponding to the changed mobile device. In some embodiments, the processor units are hot-swappable, where the processor units can be removed and inserted into processor unit cases without decoupling the external connectors of the processor unit cases from one or more external systems, services, etc.

Figure 9:
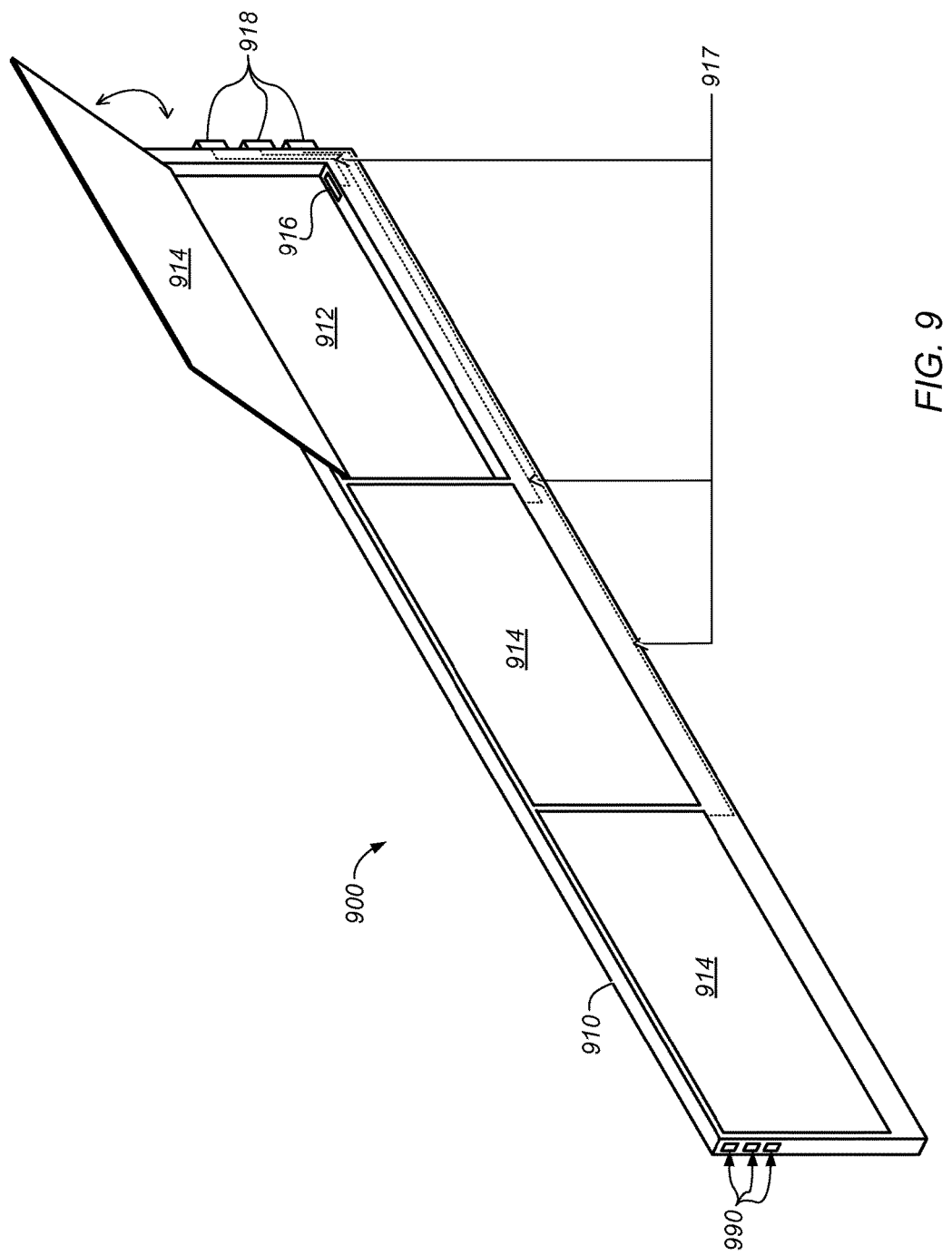
FIG. 9 illustrates a perspective view of a processor unit case in which multiple mobile device processor units can be installed according to some embodiments.

FIG. 9 illustrates a perspective view of a processor unit case in which multiple mobile device processor units can be installed according to some embodiments. The processor unit case, etc. illustrated in FIG. 9 can be implemented in one or more of the multi-unit hubs, processor units, processor unit cases, etc. illustrated and discussed above with reference to at least FIG. 1-8.

Processor unit case 900 includes housing 910, and multiple interior enclosures 912 which can receive and support separate processor units and can be enclosed via separate hatches 914. Each processor unit can be communicatively coupled to one or more various external connectors 918 of the processor unit case 900 via separate internal connectors 916 and communication pathways 917 associated with each enclosure 912.

In some embodiments, multiple processor units can be installed in a given slot of a support chassis. Such multiple processor unit installation can include installing, in the given slot, a processor unit case that includes multiple processor units, as shown in the illustrated embodiment. Such a processor unit case may extend through the entirety of the depth of the slot in the support chassis, such that installation of other processor units in the slot is precluded. In some embodiments, multiple processor unit cases can be installed in a given slot of a support chassis, where each processor unit case is coupled to a separate communication connector to communicatively couple the processor units included in each processor unit case with at least a communication network.

In some embodiments, including the illustrated embodiment, a processor unit case in which multiple processor units are received and supported includes multiple separate enclosures in which separate processor units are supported. In some embodiments, a processor unit case includes one or more enclosures in which multiple processor units are received and supported. In some embodiments, a processor unit case includes one or more indicators which provide an external indication of a state of one or more of the processor units received into the processor unit case. For example, indicators 990 on processor unit case 900 can each provide a separate indication of the state of a separate processor unit received into a separate enclosure 912 of the case 900. An indicator 900 can include one or more various signaling devices, including a light emitting diode (LED) indicator. The indicators 990 may indicate a state of a processor unit through being on or off, displaying a particular color, etc. For example, an indicator 990 may indicate, by being in a deactivated state, that no processor unit is installed in a corresponding particular one of the enclosures 912. Where a processor unit is installed in that enclosure 912, the indicator 990 may show one or more various colors to indicate the state of the installed processor unit. For example, an indicator 990 may display a green color where the installed processor unit is in a normal operating state and may display a red color where the installed processor unit is in an at least partially inoperative state. Such indicators 990 can present an externally-observable indication of the state of the installed processor units, which can direct operators to particular processor units for inspection, maintenance, replacement, etc. Processor units may be received into a processor unit case via one or more various sides of the processor unit case. In the illustrated embodiment, the processor units can be installed in the enclosure 912 via a side of the processor unit case housing 910. In some embodiments, the processor units can be installed in the interior enclosures 912 via both sides of the housing 910, via the front side of the housing, back side, top side, bottom side, some combination thereof, or the like.

Figure 10:
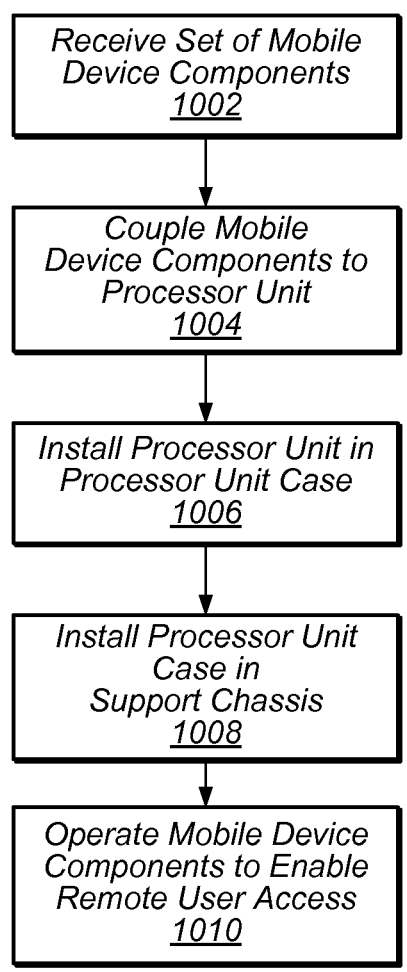
FIG. 10 illustrates configuring a limited selection of components of a mobile device to execute programs of instructions based on remote user access according to some embodiments.

FIG. 10 illustrates configuring a limited selection of components of a mobile device to execute programs of instructions based on remote user access according to some embodiments. The configuring can be implemented with regard to one or more of the processor units, hubs, clients, networks, etc. illustrated and discussed above with reference to at least FIG. 1-9.

At 1002, a set of mobile device components that correspond to a limited selection of mobile device components of a complete mobile device are received. The set of components can be derived from the corresponding limited selection of components. For example, a single component in the set of components can correspond to a combination of two or more components included in the complete mobile device. The set of components can include mobile device components removed from a complete mobile device, including a damaged mobile device, a partially or fully disassembled mobile device, etc. In some embodiments, the limited selection of mobile device components is a limited selection of components, of the mobile device, that can execute one or more particular mobile device functions, including execute one or more mobile device programs of instruction. For example, a limited selection of mobile device components can include printed circuit boards of the complete mobile device that include a processor and memory that stores mobile device programs of instruction, where the memory and processor are interoperable to execute at least some of the programs. The limited selection can include other components used to execute programs, including a wireless communication interface of the complete mobile device, a network communication interface, a display adapter device, etc.

In some embodiments, the set of mobile device components include components not included in the complete mobile device. For example, while the complete mobile device may rely on a wireless communication interface to communicatively couple with a communication network, the set of components may include network interface component that enables the set of components to couple with a communication connector, including a network communication cable, Ethernet communication cable, USB connector and cable, etc., to communicatively couple the components with a communication network. In another example, while the complete mobile device may include an onboard power supply, the set of components may include a power input interface that can receive power from an external power supply.

At 1004, the set of components are coupled to a processor unit. The set of components can be communicatively coupled with each other via one or more communication wires, which can include wires between mobile device components that correspond to wires that communicatively couple mobile device components in the complete mobile device. The set of components can be coupled to a support structure of the processor unit via one or more coupling points included in the components. The coupling points can correspond to coupling points of the corresponding components of the complete mobile device. In some embodiments, the coupling points are added to correspond to coupling points on the support structure of the processor unit. In some embodiments, the support structure of the processor unit is constructed to align coupling points on the support structure with the coupling points of the components, so that the components are coupled to the processor unit support structure in a particular arrangement. For example, the support structure can include spur elements that align with one or more coupling points of one or more of the components. The arrangement may correspond to the arrangement of corresponding components in the complete mobile device, to an arrangement of components that facilitates heat removal via airflow through the processor unit, etc.

Coupling the set of components to the processor unit support structure can include coupling one or more of the components to one or more communication connectors included in the processor unit. For example, the processor unit can include communication connectors, power connectors, etc. which can connect with one or more of the set of components to communicatively couple the components to one or more external connectors on an external side of the processor unit, where the external connectors can communicatively couple with one or more external services, systems, etc. directly or indirectly via another set of connectors.

In some embodiments, the support structure of the processor unit provides at least some structural support and stabilization to the set of components. For example, the support structure of the processor unit can provide at least some shock absorption for the set of components coupled to the processor unit.

At 1006, the processor unit is installed in a processor unit case. The processor unit can include mounting elements which can couple with mounting elements of the processor unit case to mount the processor unit in the case. The processor unit can be mounted in an interior enclosure of the processor unit case, so that a processor unit mounted in the case is at least partially enclosed by the housing of the processor unit case. Installing the processor unit in the case can include coupling one or more of the set of components in the processor unit, one or more external connectors of the processor unit, etc. with one or more connectors of the processor unit case. As a result, mounting a processor unit in a processor unit case can include communicatively coupling the set of components with one or more portions of the processor unit case. In some embodiments, the processor unit case includes one or more components that can communicatively couple with the processor unit mounted in the processor unit case to enable at least some portions of remote user access and interaction with the set of components included in the processor unit. For example, some embodiments of a processor unit case can include one or more of a display adapter device, network communication adapter device, etc. which can communicatively couple with the set of components of the processor unit via connectors, to enable communication between the set of components and a remote user via a communication network, enable output signals from the components to be adapted into display signals that are transmitted over the communication network to present a mobile device user interface to the remote user, etc.

In some embodiments, the processor unit can be removably mounted in the processor unit case enclosure. As a result, the processor unit can be field swappable from the processor unit case, where damaged processor units can be swapped for undamaged processor units, processor units that include components corresponding to an obsolete model of a complete mobile device can be swapped for processor units that include components corresponding to an up-to-date model of the complete mobile device, etc.

At 1008, the processor unit case is installed in a support chassis. The processor unit case can be inserted into a slot of the support chassis that is established from various members of the chassis, including housing members, dividers, etc. Inserting the processor unit case into the slot can include inserting the processor unit case into the slot so that one or more connectors included in the processor unit case, processor unit, etc., are coupled with one or more connectors included in the support chassis. The connectors included in the support chassis can include connectors included in a backplane circuit board coupled to one or more ends of the slots of the support chassis, so that inserting a processor unit case through one end of the slot can include coupling the processor unit case with a backplane circuit board connector at an opposite end of the slot. The connectors can include blind mate connectors. In some embodiments, the connectors included in the support chassis include one or more of power connectors, communication connectors, etc. In some embodiments, installing a processor unit case in a support chassis slot includes inserting the processor unit case into the slot so that a latch mechanism included in the support chassis engages with the processor unit case to hold the case in the slot. Connectors can be coupled with a processor unit case installed in a slot, with a processor unit included in an installed processor unit case via one or more gaps in the case housing, etc. Coupling connectors with the processor unit, processor unit case, etc. can communicatively couple the set of components included in the processor unit with one or more external service, systems, etc. including one or more external power supplies, one or more communication networks, etc.

In some embodiments, one or more computer systems, expander devices, etc. can be installed in the support chassis, where installing a processor unit in the support chassis includes communicatively coupling the processor unit with a communication network via establishing a reverse tethering connection between the processor unit and the computer system. The reverse tethering connection can include a communication connection via one or more communication cables, including one or more USB cables and connectors, which establish a communication pathway between a processor unit installed in a slot and a communication network via a communication pathway between the processor unit and a computer system included in the support chassis. In some embodiments, a pathway between a computer system and an installed processor unit includes a link with an expander device, as discussed further above.

In some embodiments, a computer system included in a support chassis can be installed in a slot of the support chassis. The support chassis can include one or more slots for a computer system, where the slot may be larger than slots for processor units and may include additional connectors in the slot, including a network cable connector, etc. The size of slots in the support chassis can correspond to the respective structural dimensions of the computer systems, processor units, etc. so that a processor unit slot is sized to accommodate a processor unit and not a computer system, etc. The slot of a support chassis can be established based at least in part upon various structural members of the support chassis that can provide structural support and stabilization of a processor unit, processor unit case, etc. installed in the slot.

At 1010, one or more of the components in the set of components are operated to enable remote user access to, and interaction with, one or more mobile device functions corresponding to mobile device functionality of a complete mobile device. Such access can include enabling a remote user to communicate with the set of components, via a network connection with the components, to command the components to execute one or more mobile device programs of instruction. The components can execute one or more such programs of instructions and generate one or more output signals. In some embodiments, the output signals include one or more display signals to the remote client over the communication network to present a mobile device user interface on a display of a client device supporting the remote user. In some embodiments, the output signals are processed by a display adapter device that is separate from the set of components to generate one or more such display signals.

Figure 11:
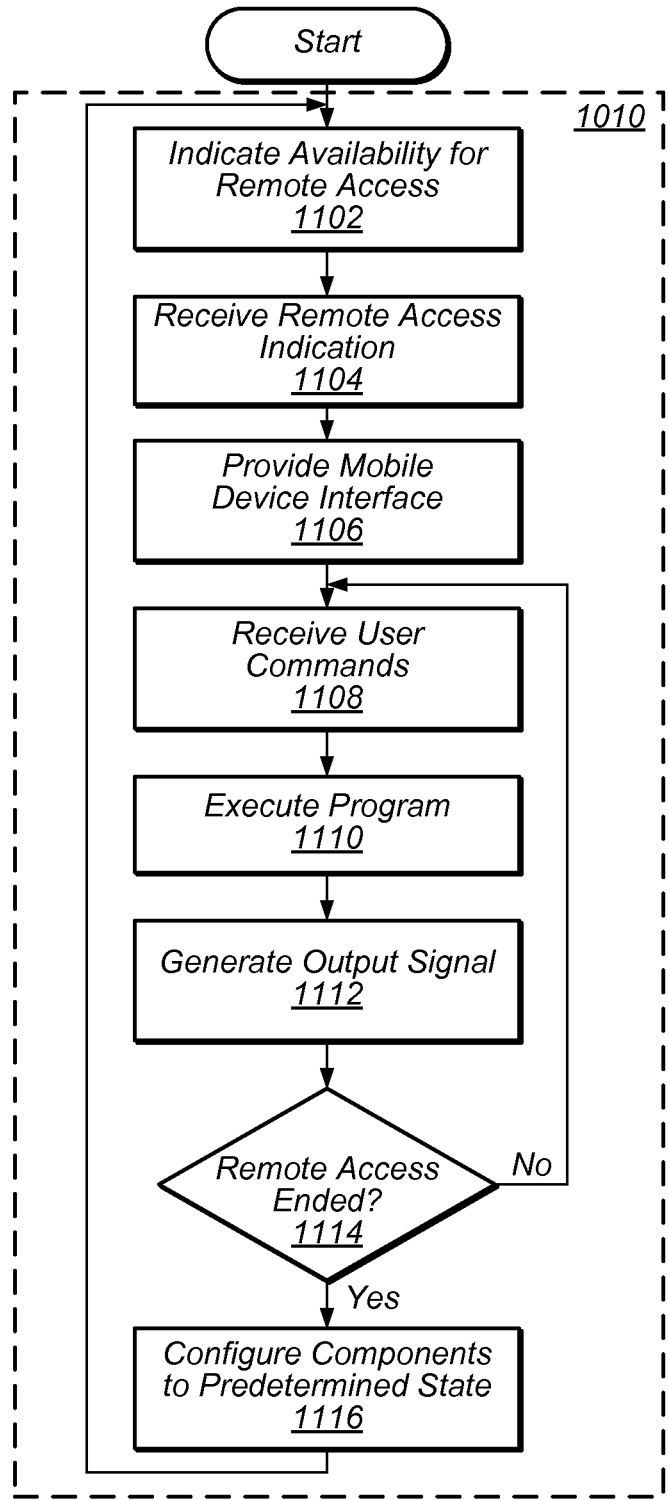
FIG. 11 illustrates interacting with a remote user to execute mobile device programs of instructions and present a mobile device user interface to the remote user according to some embodiments.

FIG. 11 illustrates interacting with a remote user to execute mobile device programs of instructions and present a mobile device user interface to the remote user according to some embodiments, as illustrated in 1010 of FIG. 10. The interacting can be implemented by one or more mobile device components included in a set of mobile device components in a processor unit, including one or more components included in one or more processor units as illustrated and discussed above with reference to FIG. 1.

At 1102, the processor unit indicates availability for a remote access session with a remote user over a communication network. The indication can be transmitted to a management system that manages remote access sessions with the processor unit by remote client devices supporting the remote users. Availability can be indicated based at least in part upon a determination, by one or more portions of the processor unit, that the set of components included in the processor unit are in a certain present state, including a default state in which changes to a memory included in the set of component, caused by previous access sessions, is deleted and the set of components are restored to a default state. In some embodiments, the indication is processed by the management system to determine that the processor unit is available for a remote access session and assign the processor unit to a remote access queue.

At 1104, the processor unit receives an indication that the processor unit is allocated to a remote user for a remote access session with the remote user. The indication can include an initial communication with the processor unit by the remote user, a signal from the management system identifying the remote user and indicating that the processor unit is allocated to a remote access session with the remote user, etc. At 1106, the processor unit generates one or more output signals that can be communicated to the remote user, via a communication network, to present a mobile device user interface to the user via a client device display. The user can interact with the presented interface to provide commands to the set of components included in the processor unit over the communication network. As the mobile device user interface that is presented to the remote user corresponds to a user interface of a complete mobile device, including a user interface that would be presented on a mobile device display of the complete user device, the remote user can interact with the presented mobile device user interface in the same manner as the user would interact with a user interface displayed on the complete mobile device to interact with mobile device functionality.

At 1108, one or more user commands are received at the processor unit from the remote user over a communication network. The user commands can be received based at least in part upon the remote user interacting with a mobile device user interface presented on a display of a client device supporting the remote user. The user may interact with the presented interface to interact with mobile device functionality, where such interaction can include one or more commands to execute one or more mobile device programs of instruction. Such commands can be communicated to the processor unit over the communication network. In some embodiments, the user interactions are communicated to the processor unit over the communication network and processed by the set of components to determine that the user is commanding execution of one or more particular mobile device programs of instruction, including execution of one or more mobile device applications.

At 1110, the one or more user-commanded mobile device programs of instructions are executed. Such programs of instructions can include various mobile device applications, functions, etc. For example, a mobile device program of instruction can include accessing an email application, browsing the internet, initializing a word processor program, initiating a wireless network connection via a mobile device wireless interface, etc. Executing a program of instruction can include generating one or more output signals. At 1112, one or more output signals are generated and communicated to the remote user over a communication network. In some embodiments, the output signals include display signals that are communicated to the client device supporting the remote user to update the presented mobile device user interface based on the execution of the one or more mobile device programs of instruction. The updated interface can correspond to an updating of an interface on a mobile device display based on the mobile device executing the one or more mobile device programs of instruction, so that the remote user experience in interacting with the presented mobile device user interface on the client device corresponds to the experience in interacting with a user interface displayed on a complete mobile device.

At 1114, a determination is made whether the remote access session is ended. Such a determination may be determined based at least in part upon a network connection between the processor unit and the remote user being terminated, a termination signal being received from the management system, etc. If not, the processor unit can continue to receive signals from the client device supporting the remote user and execute mobile device programs of instruction. If so, as shown at 1116, the processor unit can configure the set of components to a certain predetermined state corresponding with availability for another remote access session. Such configuring can include erasing locally stored data associated with the ended access session.

Figure 12:
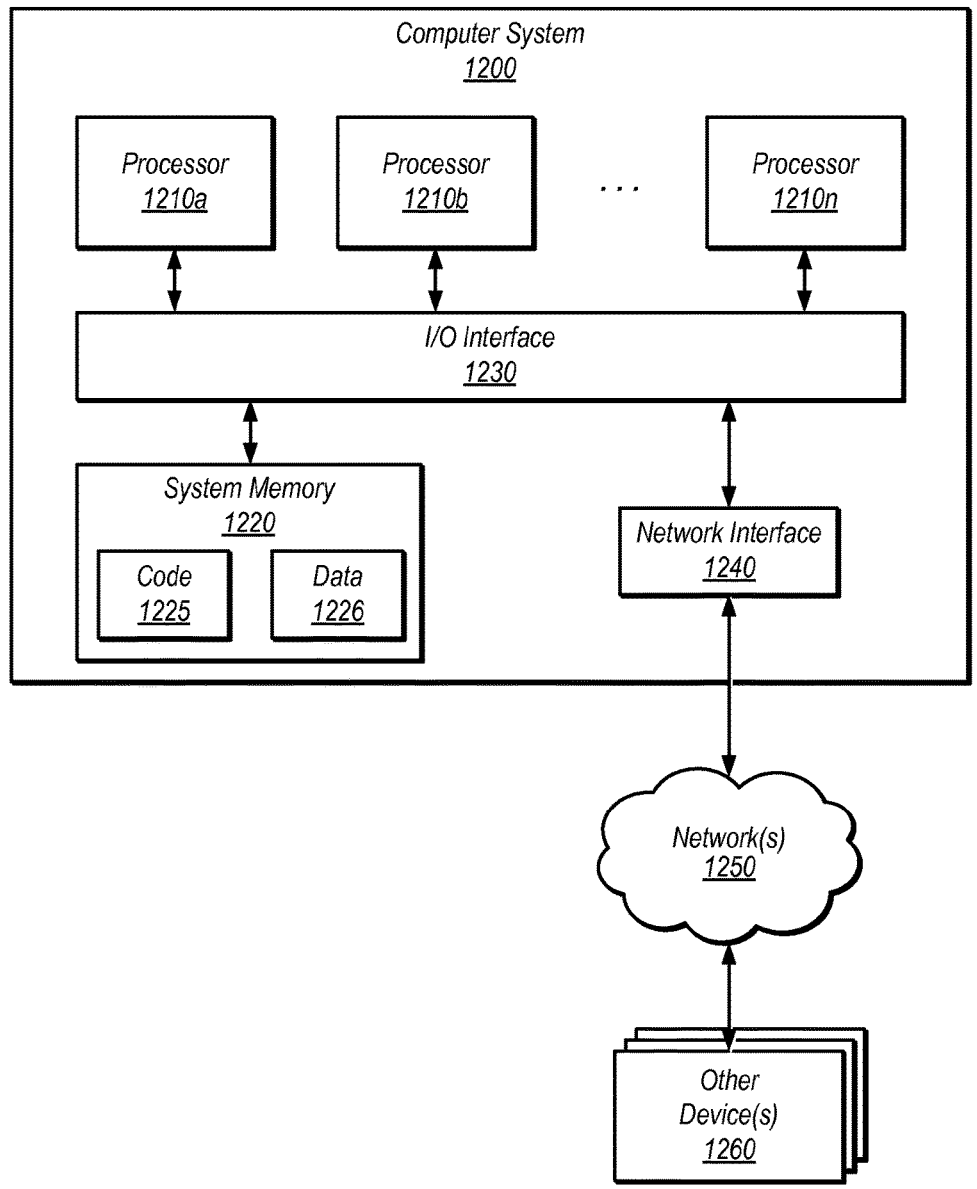
FIG. 12 is a block diagram illustrating an example computer system that may be used in some embodiments.

FIG. 12 is a block diagram illustrating an example computer system that may be used in some embodiments.

In some embodiments, a system that implements a portion or all of one or more of the technologies, including but not limited to one or more portions of the set of mobile device components, processor unit, processor unit case, management system, client device, and various power management methods, systems, devices, and apparatuses as described herein, may include a general-purpose computer system that includes or is configured to access one or more computer-accessible media, such as computer system 1200 illustrated in FIG. 12. In the illustrated embodiment, computer system 1200 includes one or more processors 1210 coupled to a system memory 1220 via an input/output (I/O) interface 1230. In some embodiments, computer system 1200 further includes a network interface 1240 coupled to I/O interface 1230. In some embodiments, computer system 1200 is independent of a network interface and can include a physical communication interface that can couple with a communication pathway, including a communication cable, power transmission line, etc. to couple with various external components, systems, etc.

In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

System memory 1220 may be configured to store instructions and data accessible by processor(s) 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as a portion or all of the set of mobile device components, processor unit, processor unit case, management system, client device, and various power management methods, systems, devices, and apparatuses as described herein, are shown stored within system memory 1220 as code 1225 and data 1226.

In one embodiment, I/O interface 1230 may be configured to coordinate I/O traffic between processor 1210, system memory 1220, and any peripheral devices in the device, including network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices 1260 attached to a network or networks 1250, such as other computer systems, components, processor units, or devices as illustrated in FIGS. 1 through 11, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks such as Fibre Channel SANs, or via any other suitable type of network and/or protocol.

In some embodiments, system memory 1220 may be one embodiment of a computer-accessible medium configured to store program instructions and data for implementing embodiments of the set of mobile device components, processor unit, processor unit case, management system, client device, etc. as described above relative to FIGS. 1-11. In other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1200 via I/O interface 1230. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Although in the embodiments described above, some of the data storage modules have been described as being 3U in height, modules may in various embodiments be 2U, 3U, 4U, 5U or any other height or dimensions.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
at least one mobile device processor unit for a mobile device comprising a wireless transceiver configured to communicate via a wireless network connection to a network, the mobile device processor unit comprising a communicatively coupled set of mobile device components that are configured to execute at least one mobile device program of instructions that are configured to receive data over the wireless network connection, the communicatively coupled set of mobile device components corresponding to a limited selection of components of an individual complete mobile device, the individual complete mobile device comprising the wireless transceiver; and
a mobile device unit support chassis comprising a slot space and configured to receive the at least one mobile device processor unit into the slot space to communicatively couple the at least one mobile device processor unit with a remotely-located computer system supporting a remotely-located user via a reverse tethering connection to a communication network;
wherein the mobile device processor unit is configured to, based at least in part upon a user interaction with the mobile device processor unit, initiated by the remotely-located user, over the reverse tethering connection to the communication network:

execute the at least one mobile device program of instructions to receive the data over the reverse tethering connection instead of the wireless network connection, and generate a display signal, based at least in part upon the execution of the at least one mobile device program of instructions, to present a mobile device user interface on a display of the remotely-located computer system supporting the remotely-located user, wherein the mobile device user interface corresponds to a mobile device user interface presented on a display of the complete mobile device.

2. The system of claim 1, comprising:

at least one computer system communicatively coupled to the communication network; and wherein to communicatively couple the at least one mobile device processor unit with the remotely-located user via the communication network, the support chassis is configured to communicatively couple the at least one mobile device processor unit with the communication network via a reverse tethering connection with the computer system.

3. The system of claim 2, wherein the mobile device unit support chassis comprises:

a particular slot space, separate from the slot space configured to receive the at least one mobile device processor unit, that is configured to:
  receive and communicatively couple the at least one computer system with the communication network via a network communication connector, and
  communicatively couple the at least one computer system with the at least one mobile device processor unit via another separate communication connector.

4. The system of claim 1, wherein:

the at least one mobile device processor unit comprises at least one network communication interface communicatively coupled with the set of mobile device components; and the mobile device unit support chassis comprises a backplane that is communicatively coupled with the communication network and is configured to couple with the at least one network communication interface of the at least one mobile device processor unit received into the slot space to communicatively couple the at least one mobile device processor unit with the communication network.

5. An apparatus comprising:

a mobile device processor unit for a mobile device comprising a wireless transceiver configured to communicate via a wireless network connection to a network, the mobile device processor unit configured to enable a set of communicatively coupled mobile device components to execute at least one mobile device program of instructions that are configured to receive data over the wireless network connection, based at least in part upon communication with a remotely-located computer system supporting a remotely-located user, the communicatively coupled set of mobile device components corresponding to a limited selection of components of an individual complete mobile device, the individual complete mobile device comprising the wireless transceiver, the mobile device processor unit comprising:

a housing configured to receive and structurally support the communicatively coupled set of mobile device components; and at least one communication connector configured to couple to at least one of the mobile device components received in the housing to communicatively couple the set of mobile device components to the remotely-located computer system via a reverse tethering connection to a communication network, wherein the mobile device processor unit is configured to:

execute the at least one mobile device program of instructions to receive the data over the reverse tethering connection instead of the wireless network connection; and generate a display signal, based at least in part upon the execution of the at least one mobile device program of instructions, to present a mobile device user interface on a display of the remotely-located computer system, wherein the mobile device user interface corresponds to a mobile device user interface presented on a display of a complete mobile device.

6. The apparatus of claim 5, wherein:

to communicatively couple the set of mobile device components to the remotely-located computer system via a communication network, the at least one communication connector is configured to communicatively couple the set of mobile device components to the communication network via a bridged network connection that is bridged by a computer system that is external to the mobile device processor unit.

7. The apparatus of claim 5, wherein:

the communication connector comprises a network communication pathway that is communicatively coupled to the communication network; and the apparatus comprises a network communication adapter device configured to communicatively couple the set of mobile device components to the communication connector to communicatively couple the set of mobile device components to the communication network.

8. The apparatus of claim 5, comprising:

a display adapter device configured to generate the display signal to present the mobile device user interface on the display of the remotely-located computer system.

9. The apparatus of claim 5, comprising:

a processor unit case configured to support the mobile device processor unit;

wherein, to support the mobile device processor unit, the processor unit case is configured to receive and structurally support the mobile device processor unit in an interior enclosure of the processor unit case.

10. The apparatus of claim 9, wherein the processor unit case comprises a hatch configured to reversibly enclose the interior enclosure in which the mobile device processor unit is received and structurally supported.

11. The apparatus of claim 9, wherein:

the mobile device processor unit is configured to be field-swappable from the interior enclosure of the processor unit case.

12. The apparatus of claim 9, wherein:

the interior enclosure of the processor unit case is configured to receive and structurally support a plurality of sets of mobile device components, wherein each of the plurality of sets of mobile device components corresponds to a separate limited selection of components of a separate individual complete mobile device; and the apparatus comprises a plurality of communication connectors that are each configured to couple to a separate set of mobile device components, of the plurality of sets of mobile device components, to communicatively couple the respective separate set of mobile device components to the communication network.

13. The apparatus of claim 5, wherein the mobile device processor unit comprises one or more air passages configured to receive and direct air from an external source to remove heat from at least one of the set of mobile device components.

14. A method, comprising:
configuring a set of communicatively coupled mobile device components to execute at least one mobile device program of instructions that are configured to transmit data over a wireless network connection, based at least in part upon communication with a remotely-located computer system supporting a remotely-located user, the communicatively coupled set of mobile device components corresponding to a limited selection of components of an individual complete mobile device, the individual complete mobile device comprising a wireless transceiver configured to communicate via a wireless network connection to a network, the configuring comprising:
installing the set of mobile device components in a slot of a mobile device unit support chassis to structurally support the set of mobile device components in the support chassis; and
coupling the set of mobile device components with a communication pathway of the mobile device unit support chassis to communicatively couple the set of mobile device components to the remotely-located computer system via a reverse tethering connection to a communication network, wherein the set of mobile device components are configured to:
execute the at least one mobile device program of instructions to receive the data over the reverse tethering connection instead of the wireless network connection and
generate a display signal, based at least in part upon said execute the at least one mobile device program of instructions, to present a mobile device user interface on a display of the remotely-located computer system, wherein the mobile device user interface corresponds to a mobile device user interface presented on a display of a complete mobile device.

15. The method of claim 14, the configuring further comprising:
installing at least one computer system in another slot of the mobile device unit support chassis, wherein the at least one computer system is configured to administer at least a portion of the set of mobile device components;
wherein coupling the set of mobile device components with the communication pathway of the mobile device unit support chassis comprises communicatively coupling the set of mobile device components to the at least one computer system.

16. The method of claim 15, wherein:
installing the set of mobile device components in a slot of a mobile device unit support chassis comprises installing the set of mobile device components in a processor unit slot that is exclusively configured to structurally and communicatively support the set of mobile device components; and
installing at least one computer system in another slot of the mobile device unit support chassis comprises installing the at least one computer system in a computer system slot that is exclusively configured to structurally and communicatively support the at least one computer system.

17. The method of claim 14, wherein:
the communication pathway comprises a network communication pathway that is communicatively coupled to the communication network;
the set of communicatively coupled mobile device components comprises a network communication adapter device that is separate from components of the individual complete mobile device; and
coupling the set of mobile device components with a communication pathway of the mobile device unit support chassis comprises coupling the network communication pathway with the network communication adapter device to communicatively couple the set of mobile device components to the communication network via at least the network communication adapter device.

18. The method of claim 14, wherein installing the set of mobile device components in a slot of a mobile device unit support chassis comprises:
coupling the set of mobile device components with a mobile device processor unit;
installing the mobile device processor unit in an interior of a processor unit case to structurally support the mobile device processor unit; and
installing the processor unit case in the slot of the mobile device unit support chassis.

19. The method of claim 18, wherein:
installing the processor unit case in the slot comprises slidably inserting the processor unit case into the slot to couple at least a communication connector of the processor unit case with a complementary communication connector of the mobile device unit support chassis to communicatively couple the set of mobile device components with the communication network.

20. The method of claim 18, comprising field swapping a set of mobile device components in the mobile device unit support chassis, the field swapping comprising:
removing the processor unit case from the slot;
replacing the mobile device processor unit in the interior of the processor unit case with another separate mobile device processor unit that comprises another separate set of mobile device components; and
installing the processor unit case into the slot to communicatively couple the other separate set of mobile device components with the communication network.

* * * * *